(12) United States Patent
Frattura et al.

(10) Patent No.: US 7,690,040 B2
(45) Date of Patent: Mar. 30, 2010

(54) METHOD FOR NETWORK TRAFFIC MIRRORING WITH DATA PRIVACY

(75) Inventors: David E. Frattura, New York, NY (US); Richard W. Graham, Derry, NH (US); John Roese, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 1218 days.

(21) Appl. No.: 11/075,936

(22) Filed: Mar. 8, 2005

(65) Prior Publication Data

US 2005/0278565 A1 Dec. 15, 2005

Related U.S. Application Data

(60) Provisional application No. 60/552,047, filed on Mar. 10, 2004.

(51) Int. Cl.
- G06F 21/00 (2006.01)
- H04L 29/06 (2006.01)
- H04L 9/00 (2006.01)
- G06F 12/14 (2006.01)
- G06F 17/30 (2006.01)

(52) U.S. Cl. ................... 726/26; 726/14; 713/193; 707/204

(58) Field of Classification Search ................... None
See application file for complete search history.

(56) References Cited

U.S. PATENT DOCUMENTS

| | | | |
|---|---|---|---|
| 5,659,614 A * | 8/1997 | Bailey, III | ................... 713/165 |
| 6,041,042 A | 3/2000 | Bussiere | |
| 6,870,817 B2 | 3/2005 | Dolinar et al. | |
| 7,240,219 B2 * | 7/2007 | Teicher et al. | ............... 713/193 |

(Continued)

FOREIGN PATENT DOCUMENTS

EP 1465368 A1 10/2004

(Continued)

OTHER PUBLICATIONS

Hardaker, Wes, et al., "Justification and Requirements for a National DDoS Defense Technology Evaluation Facility," retrieved from the internet http://www.isi.edu/deter/docs/02-052DDoS_Defense_Evaluation_Facility.pdf.

(Continued)

*Primary Examiner*—Christopher A Revak
(74) *Attorney, Agent, or Firm*—McCarter & English, LLP

(57) ABSTRACT

Systems and methods are provided for preserving the privacy of data contained in mirrored network traffic. The mirrored network traffic may comprise data that may be considered confidential, privileged, private, or otherwise sensitive data. For example, the data payload of a frame of mirrored network traffic may include private Voice over IP (VoIP) communications between users on one or more networks. The present invention provides various techniques for securing the privacy of data contained in the mirrored network traffic. Using the techniques of the present invention, network traffic comprising confidential, privileged, private, or otherwise sensitive data may be mirrored in such a manner as to provide for the privacy of such data over at least a portion if not all of the mirrored communications between the mirror source point and the mirror destination point.

30 Claims, 18 Drawing Sheets

U.S. PATENT DOCUMENTS

| | | |
|---|---|---|
| 7,269,743 B2 * | 9/2007 | Yagawa ...................... 713/189 |
| 2002/0078384 A1 | 6/2002 | Hippelainen |
| 2004/0003094 A1 | 1/2004 | See |
| 2004/0006702 A1 * | 1/2004 | Johnson ...................... 713/189 |
| 2004/0233904 A1 * | 11/2004 | Saint-Hilaire et al. ....... 370/389 |
| 2005/0114522 A1 | 5/2005 | LaVigne et al. |
| 2005/0220092 A1 | 10/2005 | Lavigne et al. |
| 2006/0037075 A1 | 2/2006 | Frattura et al. |
| 2008/0016373 A1 * | 1/2008 | Yagawa ...................... 713/189 |

FOREIGN PATENT DOCUMENTS

| | | |
|---|---|---|
| WO | WO-98/49626 | 11/1998 |
| WO | WO-03/047205 A1 | 6/2003 |

OTHER PUBLICATIONS

Sweeney, Latanya, et al., "The Laboratory for International Data Privacy," retrieved from the internet http://privacy.cs.cmu.edu/dataprivacy/HIPAA/HIPAAcomments.pdf.

International Search Report Application No. PCT/US2005/007927, dated Aug. 8, 2005.

U.S. Office Action for U.S Appl. No. 11/208,372, mailed Jun. 21, 2007.

International Search Report for Application No. PCT/US05/29737 dated Jun. 7 2007.

International Preliminary Report on Patentability for Application No. PCT/US2005/028737, dated Jul. 3, 2007.

* cited by examiner

METHOD FOR NETWORK TRAFFIC MIRRORING WITH DATA PRIVACY

RELATED APPLICATIONS

This present application claims priority to U.S. Provisional Patent Application No. 60/552,047, entitled "Method and Apparatus for Secure Dynamic Network Traffic Mirroring", filed Mar. 10, 2004, which is incorporated herein by reference.

TECHNICAL FIELD

The present invention generally relates to systems and methods of providing for the privacy of data of mirrored network traffic.

BACKGROUND INFORMATION

The mirroring of network traffic is a common feature found in many network relay devices, such as network switches. Network traffic mirroring, or port mirroring, is a method of monitoring network traffic that forwards a copy of each incoming and outgoing frame from one port of a network device, such as a switch, to another port of the network device from which the mirrored network traffic may be studied. Network traffic mirroring provides a service that duplicates network frames as they pass through a device to another port, or remote system, and may duplicates all or a portion of the network traffic. Network traffic mirroring may be used for network troubleshooting, network security and performance monitoring, and security audits. A network administrator may use mirroring as a diagnostic tool or debugging feature, such as a tool for investigating network intrusions or network attacks. Network mirroring may be performed and managed locally or remotely.

The concern over information privacy is an increasingly more significant concern for government, businesses and individuals. The United States and foreign governments have enacted laws and regulations with respect to the privacy and confidentiality of sensitive information. For example, the United States government has enacted multiple Acts mandating information privacy, such as the Health Insurance Portability and Accountability Act of 1996, referred to as HIPAA, and The Financial Modernization Act of 1999, also known as the "Gramm-Leach-Bliley Act" or GLB Act. The HIPAA Privacy Rule is directed towards setting a national standard for electronic transfers of personal health and medical information data. The GLB Act governs the collection and disclosure of customers' personal financial information by financial institutions, and also applies to other types of companies who receive such information. In another example, the European Union enacted a Directive, referred to as the Data Directive, which imposes strict requirements on the collection, use and disclosure of personal data by businesses in the European Union. Additionally, the Data Directive states that these businesses may not transfer data outside the European Union unless the recipient country provides adequate protection for personal data. Along with complying with multiple privacy rules of various laws and regulations, many companies are also concerned about the confidentiality of their company data. Companies may be concerned with industrial espionage or would like to prevent information that may damage their reputation from becoming publicly available.

Additionally, the convergence of data, voice, and video over network traffic provides various types, forms and sources of information in electronic communications that may be considered personal, private, privileged, or confidential. For example, voice over internet protocol (VoIP) technology provides for the electronic exchange of telephone conversations between individuals over a network and the Internet. Computers, networks and electronic communications are used by many individuals and companies to exchange sensitive or confidential information. Even those involved with criminal or illegal activities may use electronic communications as a means to facilitate their activities. Other laws and regulations, such as the Electronic Communications Privacy Act governs not only the privacy of electronic communications but also the use of wire tapping and other tools to intercept and monitor electronic communications of suspected criminal activity. Companies, law enforcement agencies, and individuals need to be concerned with protecting the privacy of legitimate electronic communications while being able to effectively use wire tapping as a tool to determine criminal activity.

Typically, individuals or companies exchanging electronic communications have knowledge, it not at least a sense, of the source and destination end points of the communication, and the security and privacy of such information during the exchange. For example, when a first user sends a second user an email, both users appreciate the email was sent from a computing device of the first user and received by a computing device of the second user and may have traveled a route between their respective networks and network service providers. In other cases, a user may communicate with a website providing confidential information via a secured communication channel. In another case, two companies may exchange confidential information directly via a secure point to point connection. Although there may exist security and privacy issues during these exchanges, the end point locations involved in the exchange can assess and appreciate any of the risk and provide measures to address such risks.

However, network traffic mirroring duplicates network traffic to a location not involved in the network conversation. In many cases, the network traffic mirroring may be performed unbeknownst to any party exchanging data in the network traffic being mirrored. One or more network relay devices in the network route of the communication change may be configured to provide port mirroring. The mirrored network traffic may be copied to a local analyzer, computer or system. Additionally, the network traffic may be mirrored to a remote location, such as a remote device or system. The mirrored network traffic may traverse a different network path than the originally exchanged communications being mirrored, including other network segments, networks and the Internet. As such, the mirrored network traffic may traverse network routes and be provided to locations not intended by the original communication participants. Since traffic mirroring replicates network traffic to locations not involved in the network conversation, the potential for exposing personal, private, privileged, or confidential information may be significant.

SUMMARY OF THE INVENTION

The present invention provides systems and methods for preserving the privacy of data contained in mirrored network traffic. The mirroring of network traffic may comprise data that may be considered secret, classified, confidential, privileged, or private, such as Voice over IP (VoIP) transmissions. The network traffic may be mirrored from a mirror sender, referred to as a mirror source point, to a mirror receiver, referred to as a mirror destination point, locally or remotely over various network segments, such as private and public networks and the Internet. The network traffic may be mirrored to locations not involved in the network communications being mirrored. As such, the otherwise confidential, privileged or private data may be accessed or otherwise accessible by unintended parties via the mirroring of the network traffic.

The present invention provides various techniques for securing the privacy of the data contained in the network traffic mirrored from a mirror source point to a mirror destination point. In one technique of the present invention, the mirrored network traffic is encrypted and encapsulated using an encapsulating protocol to communicate from the source mirror point to the destination mirror point. In another technique of the present invention, portions of a frame of network traffic are encrypted to provide a partially encrypted frame. In some cases, any of the fields associated with the network protocol layer through the application protocol layer of the frame may be encrypted. In other cases, one or more fields beyond the network and transport protocol layers of the frame are encrypted. Also, the partially encrypted frames may be mirrored remotely by using the IEEE 802.1Q VLAN tag in a virtual LAN environment.

Additionally, the present invention provides privacy of data of mirrored network traffic by blanking and/or scrambling portions of data of the frame being mirrored. Many times, when troubleshooting or auditing a network, the entire contents of a frame of network traffic are not needed for review or analysis. For example, to trouble shoot HyperText Transfer Protocol (HTTP) transactions, a network analysis device would only need visibility into the data link header, the network layer header, the transport layer header and the HTTP protocol header. The data payload contents could be blanked or scrambled. In the cases of data blanking, the data contents may be replaced with a random binary pattern or a predefined binary pattern. In other blanking cases, the data may be replaced with other data that is valid but not private. In the case of scrambling, the data that is going to be kept private is replaced with a binary pattern generated from a mathematical operation on the data that should remain private. Additionally, instead of blanking or scrambling data of the frame, in another technique of the present invention, the data intended to be kept private is deleted from the frame and one or fields of the frame are recalculated and replaced to provide a valid frame to be communicated over the network.

In another aspect, the present invention provides system and methods for mirror destination point authentication and authorization. Many types of devices may be used in port mirroring, such as network traffic analyzers, network traffic recorders, and network security auditing tools. Sometimes a network operator may connect one of these devices to a network relay device, configure a mirror network traffic session, and leave the device unattended. An unauthorized or malicious entity may gain access to the network relay device, disconnect the current mirror receiving device and replace it with another device. Using the techniques of the present invention, a network relay device performing the mirroring of network traffic can authenticate and authorize a mirror receiving device to receive mirrored traffic. Additionally, the network relay device can ensure that the authorized mirror receiving device is not disconnected and replaced with a non-authenticated and/or non-authorized device. If a disconnection is detected, the network relay device can stop mirroring to the mirror receiving device, and re-authenticate and re-authorize a connected device.

In one aspect, the present invention is related to a method for providing data privacy of mirrored network traffic during mirroring between a mirror source point and a mirror destination point. A portion of selected data of the unit of network traffic, such as a portion of a frame, may include confidential, private, or privileged data desired to be kept private, such as a communication from one or more users of the network. Additionally, the data may include classified or secret information at any level of sensitivity, such as top secret information. The method includes a step of providing a unit of network traffic to a mirror source point of a first network device on a network for mirroring to a mirror destination point. The mirror source point alters the unit to provide privacy for at least a portion of selected data of the unit during at least a portion of mirroring communications to the mirror destination point. The mirror source point communicates the altered unit to the destination mirror point. The mirror destination point may be associated with a network device accessible over the network via one or more of the following: 1) a network relay device, 2) a network entry device, 3) a network segment, 4) a transmission medium, and/or 5) a public network, such as the Internet. Alternatively, the mirror destination point may be on the same network device as the mirror source point such as the first network device.

In one embodiment of the present invention, the mirror source point may alter the unit by encrypting the unit and encapsulating the encrypted unit in a tunneling protocol communicated from the mirror source point to the mirror destination point. The tunneling protocol may include any bridgeable or routable protocol such as any one of the following: 1) Point-To-Point Tunneling protocol, 2) Layer 2 Tunneling Protocol, 3) Generic Routing Encapsulation, 4) Internet Protocol Security, 5) MAC-in-MAC tunneling, and/or 6) Multi-Protocol Label Switching.

In another embodiment of the present invention, the mirror source point may alter the unit by encrypting a portion of the selected data of the unit and encapsulating the partially encrypted unit in a non-tunneling protocol communicated from the mirror source point to the mirror destination point. The non-tunneling protocol may include the Secure Sockets Layer (SSL) and/or the HyperText Transfer Protocol Secured (HTTPS) protocol. The partially encrypted unit may include the encryption of at least a value of one of the following: 1) a field of the unit associated with a network protocol layer of the unit, 2) a field of the unit associated with an application protocol layer of the unit, and/or 3) a field of a protocol layer of the unit above the transport protocol layer.

In a further embodiment, the present invention may alter the unit of mirrored network traffic for data privacy by blanking a portion of the selected data of the unit. The unit may be blanked by replacing a portion of the selected data of the unit with a random binary pattern or a predefined binary pattern. In another embodiment, the selected data of the unit of mirrored network traffic is altered by scrambling a portion of the unit. For example, a portion of selected data of the unit may be replaced with the portion of the data scrambled via a mathematical operation. Furthermore, a portion of the selected data of the unit may be replaced with blanked or scrambled data at a location beyond an offset of the unit determined by the mirror source point from a protocol type identified by the unit.

In yet a further embodiment of the present invention, the unit of mirrored network traffic may be altered by shaving or deleting a portion of the selected data of the unit. A portion of selected data from the unit is deleted and the unit is modified to comprise a valid length unit for communicating from the mirror source point to the mirror destination point.

In another aspect, the present invention is directed towards a network device for providing privacy of data of mirrored network traffic during mirroring between a mirror source point and a mirror destination point. A portion of selected data of the unit of network traffic, such as a portion of a unit, may include confidential, private, or privileged data desired to be kept private, such as a communication from one or more users of the network. The network device includes a mirror source point, a privacy mechanism, and a network interface. The mirror source point includes a port for receiving a unit of network traffic for mirroring to a mirror destination point. The privacy mechanism provides a mechanism for altering the unit to provide privacy for at least a portion of selected data of the unit during at least a portion of mirroring communications to a mirror destination point. The network interface is used for communicating the altered unit to the destination mirror point. The network interface may communicate the altered unit via any port of the network device, such as the port of the mirror source point. The mirror source point may be connected to a port of another network device configured to mirror network traffic or a network tapping device. The mirror destination point may be associated with a network device accessible over the network via one or more of the following: 11) a network relay device, 2) a network entry device, 3) a network segment, 4) a transmission medium, and/or 5) a public network, such as the Internet. Alternatively, the network device may include both the mirror source point and the mirror destination point.

In one embodiment, the privacy mechanism of the present invention encrypts the unit and encapsulates the encrypted unit in a tunneling protocol communicated via the network interface to the mirror destination point. The tunneling protocol may include any bridgeable or routable protocol such as any one of the following: 1) Point-To-Point Tunneling protocol, 2) Layer 2 Tunneling Protocol, 3) Generic Routing Encapsulation, 4) Internet Protocol Security, 5) MAC-in-MAC tunneling, and/or 6) Multi-Protocol Label Switching.

In another embodiment of the present invention, the privacy mechanism may encrypts a portion of the selected data of the unit and encapsulate the partially encrypted unit in a non-tunneling protocol communicated via the network interface to the mirror destination point. The non-tunneling protocol may include a Secure Sockets Layer (SSL) and/or HyperText Transfer Protocol Secured (HTTPS) protocol. Additionally, the privacy mechanism may encrypt a value of a field of the unit associated with 1) a network protocol layer of the unit, 2) an application protocol layer of the unit, and/or 3) a protocol layer of the unit above the transport protocol layer.

In one embodiment, the privacy mechanism of the present invention blanks a portion of the selected data of the unit by replacing a portion of the selected data of the unit with a random binary pattern or a predefined binary pattern. In another embodiment, the privacy mechanism of scrambles a portion of the selected data of the unit by replacing a portion of the selected data with the portion of the selected data scrambled via a mathematical operation. Additionally, the privacy mechanism may blank and/or scramble the portion of selected data of the unit located beyond an offset determined by the mirror source point from a protocol type identified by the unit.

In yet a further embodiment of the present invention, the privacy mechanism shaves a portion of the selected data of the unit by deleting a portion of the selected data from the unit and modifying the unit to comprise a valid length unit for communicating via the network interface to the mirror destination point.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1A:
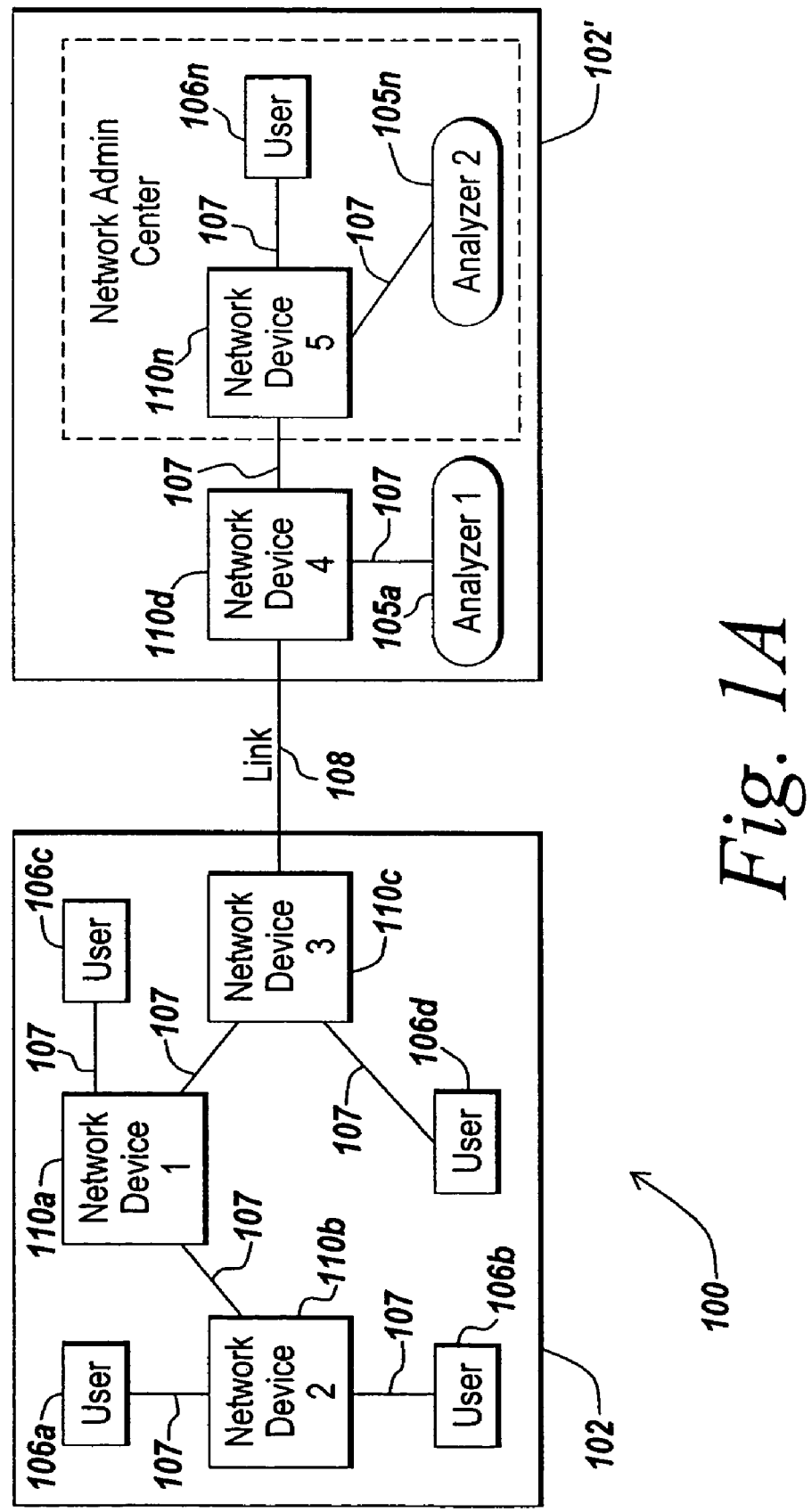
FIG. 1A is a block diagram of an illustrative network environment for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for preserving the privacy of data contained in mirrored network traffic. Network traffic may be mirrored from a mirror sender, referred to as a mirror source point, to a mirror receiver, referred to as a mirror destination point, by duplicating or copying all or a portion of frames of network traffic. The network traffic may be mirrored locally on a local area network (LAN) from one network relay device to another network relay device, or from a network relay device directly to a network mirror receiving device, such as a network analyzer. The network traffic may be mirrored remotely over various network relay and other network devices, network segments, transmissions mediums and other network systems and networks, such as any private/public network and the Internet.

The mirrored network traffic may comprise data that may be considered confidential, secret, classified, privileged, private, or otherwise sensitive data. For example, the data payload of a frame of mirrored network traffic may include private Voice over IP (VoIP) communications between users on one or more networks. In another example, a frame of mirrored network traffic may include data of confidential email communications and documents communicated between corporate employees. The network traffic may be mirrored to a mirror destination point not involved in the original network traffic being mirrored. For example, network traffic of email and/or VoIP between a first user and a second user on a first network segment of a corporate LAN may be mirrored to another corporate network segment in the same or different facility. In another example, the network traffic between the first and second user may be remotely mirrored through various network segments and networks over the Internet to a remote facility and mirror receiving device, such as an analyzer.

The illustrative embodiment of the present invention provides various techniques for securing the privacy of the data contained in the mirrored network traffic. Using the techniques of the present invention, network traffic comprising confidential, privileged, private, or otherwise sensitive data may be mirrored in such a manner as to provide for the privacy of such data over at least a portion if not all of the mirrored communications between the mirror source point and the mirror destination point. The following four techniques, including any alternatives, variations, and modifications thereto, of the illustrative embodiment of the present invention will be described: 1) encrypted tunneling/encapsulation, 2) mirrored frame encryption (partial frame encryption), 3) frame data blanking/scrambling, and 4) frame data shaving. These techniques may be practiced in one more network devices of the mirror source point and the mirror destination point. Additionally, the present invention may be practiced in a network tap device connectable to a mirror source and/or destination point and configured to provide privacy of data in accordance with the techniques of the present invention described herein.

In an encrypted tunneling technique of the illustrative embodiment of the present invention, a frame of the mirrored network traffic is encrypted and encapsulated using a tunneling protocol communicated from the source mirror point to the destination mirror point. The tunneling protocol may include any tunneling type protocol, such as secure tunneling protocol, and other higher level protocols such as Secure Socket Layer (SSL) tunnels. Alternatively, a Medium Access Control (MAC) layer tunneling method may be used to encapsulate a MAC layer frame within another MAC header. The encrypted tunneling technique keeps the data of the frame private, even when it travels over intermediary nodes that may also perform additional mirroring. For example, an intermediate network relay device between the mirror source point and mirror destination point may provide a second mirror. Since this technique of the present invention provides encapsulated, encrypted mirrored network traffic, the second mirroring device would mirror the encapsulated and encrypted network traffic. As such, the data of the frames of the first mirrored network traffic would remain private through one or more subsequent network traffic mirroring.

In a mirrored frame encryption technique of the illustrative embodiment of the present invention, portions of a frame of network traffic may be encrypted without using an encapsulating technique or tunneling protocol. In one embodiment, one or fields of the application protocol layer of the frame may be encrypted. The encrypted portion of the frame may include the application data payload and any application related headers. For example, the present invention may encrypt the HyperText Transfer Protocol (HTTP) header and data of a frame having HTTP application data. In another embodiment, the fields of the frame associated with the network through the applications layer protocols may be encrypted. In other embodiments, fields beyond the network and transport protocol layers of the frame are encrypted. The partially encrypted frame using this technique of the present invention provides privacy for the portions of data that have been encrypted.

In the illustrative mirrored frame encryption technique of the present invention, the partially encrypted frame is sent from the mirror source point to the mirror destination point. A flag or other type of indicator may be specified in the frame to indicate to the mirror destination point that the frame has been partially encrypted. The mirror destination point can decrypt the encrypted portions of the frame for analysis. Also, the partially encrypted frame may used in conjunction with the IEEE 802.1Q VLAN tag to provide mirroring communications between network relay devices configured to be on a virtual LAN (VLAN).

In a frame blanking technique of the illustrative embodiment of the present invention, portions of a frame of mirrored network traffic may be blanked. In one embodiment, the blanking technique replaces all or a portion of the data contents of the frame, e.g., the data payload, with a random binary pattern or a predefined binary pattern. In other embodiments, the data may be replaced with other data that is valid but not private. In another version of this technique, the data desired to be kept private is "shaved", or deleted, from the frame. Some of the fields of the frame may be recalculated and replaced to provide for the frame with shaved data to be communicated to the mirror destination point. Using the blanking or shaving technique, the mirror destination point can still analyze other portions of the frame, such as different protocol layer headers, without needing visibility to the private data which has been blanked or shaved.

In a frame scrambling technique of the illustrative embodiment of the present invention, portions of a frame of mirrored network traffic may be scrambled. The data to be kept private is replaced with a binary pattern generated from a mathematical operation on the private data. That is, the private data is replaced with a copy of the private data scrambled via a mathematical operation, function or any other type of scrambling algorithm. The mirror destination may have knowledge of or be able to obtain access to a means or mechanism to unscramble the scrambled portion once the mirrored frame is received.

Also, in the data blanking and scrambling techniques of the illustrative embodiment of the present invention, the data to be blanked or scrambled may be determined by either statically or dynamically defined offset locations in the frame. A network device incorporating or using the techniques of the present invention may be configured to specify at what locations of the frame the data should be blanked or scrambled. The network device may also determine the offset from which to blank or scramble data by analyzing network traffic flow for the type of network traffic and the type of one or more protocols used by the frame.

Additionally, the illustrative embodiment of the present invention provides for a network tap device that incorporates any of the data privacy techniques of the present invention. The network tap device may include one or more ports for receiving mirrored network traffic from a mirror source point or for otherwise acting as a mirror source point. Also, the network tap device may include a network attachment interface for communicating mirrored network traffic to a mirror destination point. The network tap device may be connectable to a mirroring port of a network relay device or to a tap device that intercepts and forwards network traffic. The illustrative network tap device of the present invention includes suitable means and/or mechanisms for performing any of the data privacy techniques discussed herein on mirrored network traffic. The network tap device may encrypt and encapsulate frames of the network traffic as in the encrypted tunneling technique, or may encrypt portions of the frame as in the frame encryption technique. Additionally, the illustrative network tap device may include any of the blanking, scrambling, and shaving techniques described herein.

Furthermore, the illustrative embodiment of present invention provides system and methods for the authentication and authorization of mirror receiving devices, such as a remote probe or analyzer, the mirror destination point, or a mirror tunnel termination point. Using the authentication and authorization techniques of the present invention, a network relay device performing the mirroring of network traffic can authenticate and authorize a mirror receiving device for receiving mirrored traffic. Additionally, the network relay device can ensure that the authorized mirror receiving device is not disconnected and replaced with a non-authenticated and/or non-authorized device. If a disconnection is detected, the network relay device can stop mirroring to the mirror receiving device, and re-authenticate and re-authorize a connected device.

FIG. 1A depicts an example network environment suitable for practicing an illustrative embodiment of the present invention. In brief overview, the network environment 100 includes a first network system 102 and a second network system 102' interconnected through an inter-network link 108. For example, network system 102 may represent a network infrastructure, or a portion thereof, of a facility, building, or floor of a corporate enterprise. The network system 102' may represent another network infrastructure of another facility, building, floor of the corporate enterprise, or of a third party, such as a vendor or customer of the corporate enterprise. The network system 102 may include one or more network devices, such as network devices 110a, 110b, and 110c, and the network system 102' may also include one or more network devices, such as network devices 110d-110n. The network device 110a-110n may comprise a router, switch, hub, access point, special or general purposes computing device, or any other electronic device for sending, receiving, relaying, terminating, forwarding, and/or otherwise processing network communications by any type of transmission medium at any or one or more of the network protocol layers. The network device 110a-110n may comprise any other type and/or form of computing or telecommunications device that is capable of communication and that has sufficient processor power and memory capacity to perform the operations described herein. Furthermore, the network device 110a-110n may be implemented by any suitable means and/or mechanism in software, hardware, or any combination thereof.

The network systems 102, 102' may include users of the network systems 102, 102', such as users 106a-106n. A user 106a-106n may include a human user or computing device, such as a client or server computer, or a combination of a human user and one or more computing devices of any type and/or form. Any of the users 106a-106n may be connected to a network device 110a-110n via any type of communication interface and/or link 107. In turn, any of the network device 110a-110n may be connected to other network devices 110a-110n via any type of communication interface and/or link 107, 108. Additionally, the network devices 110a-110n may interface to a Local Area Network (LAN), Metropolitan Area Network (MAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above.

The users 106a-106n can connect to the network devices 110a-110n through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.1a, IEEE 802.11b, IEEE 802.11g, and direct asynchronous connections).

The links 107, 108 between any user 106a-106n, network device 110a-110n, and/or network system 102, 102' may include any type and/or form of transmission medium, such as electrical wiring or cabling, fiber optics, electromagnetic radiation or via any other type and/or form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a network device 110a-110n to practice the operations of the present invention as described herein.

Although FIG. 1A generally describes an illustrative network environment 100, one ordinarily skilled in the art will recognize and appreciate the various types and/or forms of network devices, network entry devices, network systems, network topologies, network infrastructures, transmission mediums, communication links, communication protocols, users, and/or computing devices that may used in a networking environment 100 in practicing the operations of the present invention as described herein. Additionally, one ordinarily skilled in the art will recognize and appreciate that any of the network systems 102, 102' may comprise any type and/or form of network segments, sub-networks, and one or more portions of the network environment 100 may communicate via the Internet. Furthermore, although FIG. 1A is shown with multiple network systems 102 and 102', one ordinarily skilled in the art will recognize and appreciate the network environment 100 may comprise a single network system 102 or any number of network systems 102, 102'.

The network environment 100 of FIG. 1A may be used for network traffic mirroring, remotely or locally, from any network device 110a-110n to any other network device 110a-110n configured to perform network traffic mirroring. Additionally, any network device 110a-110n may be connected to and in communication with one or more analyzers 105a-105n, such as analyzer 105a connected to network device 110c and analyzer 2 105n connected to network device 110n. The analyzer 105a-105n may comprise any type of network device 110a-110n, or may be any other type and/or form of electronic device that may be used for reviewing, analyzing, sniffing, trouble-shooting, inspecting, intercepting, filtering, debugging, monitoring, or otherwise processing any portion of mirrored network traffic. One ordinarily skilled in the art will recognize and appreciate the various types and/or form of analyzers 105a-105n that may be used in practicing the operations of the present invention as described herein.

In accordance with the operations of the present invention described herein, any of the network devices 110a-110n, analyzers 105a-105n, and/or communication links 107, 108 may comprise communicating any mirrored network traffic using any of the data privacy techniques of the present invention. Additionally, any of the network devices 110a-110n and/or analyzers 105a-105n may perform, incorporate, or otherwise use any of the data privacy techniques of the present invention, or may comprise a network tap device in another embodiment of the present invention.

Figure 1B:
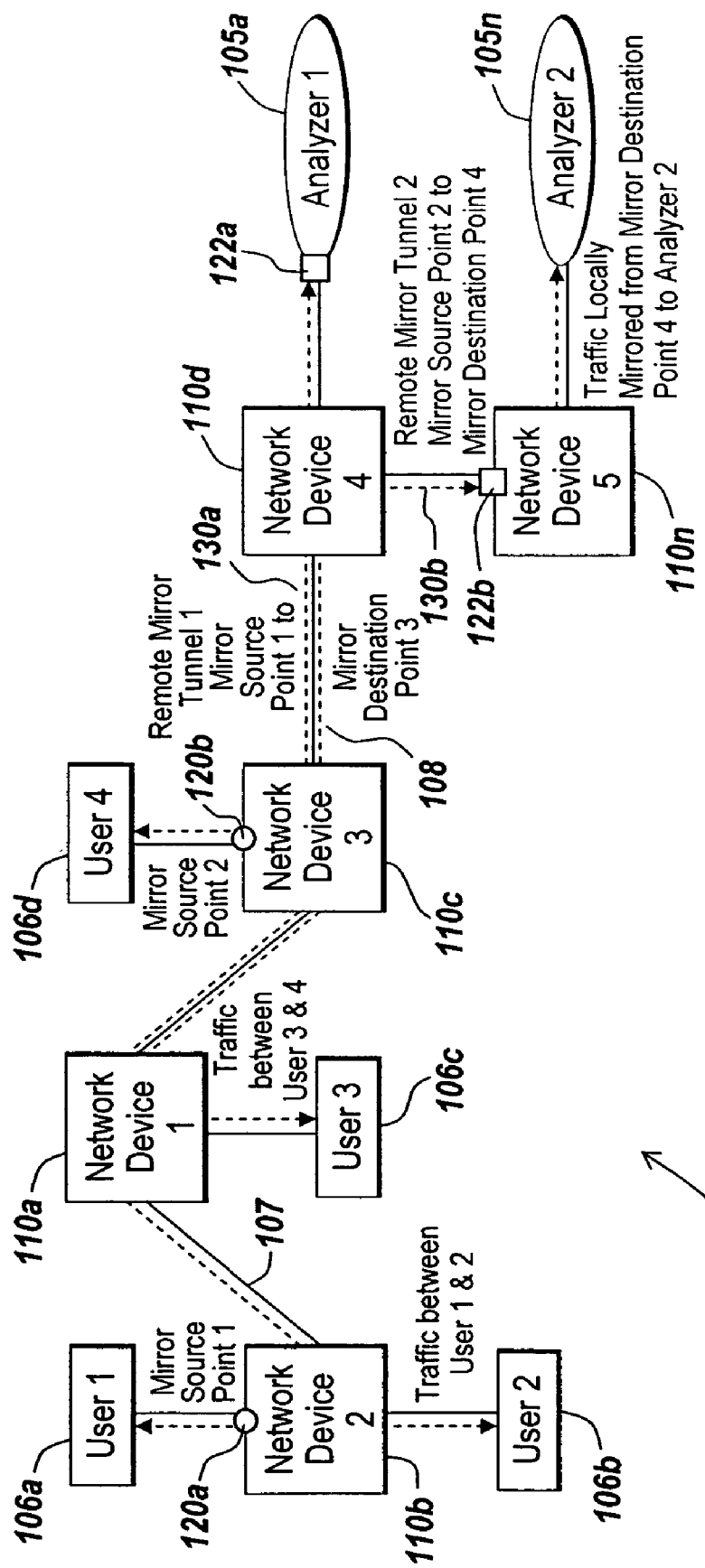
FIG. 1B is a block diagram of an illustrative embodiment of network devices practicing an illustrative embodiment of the present invention.

FIG. 1B depicts another illustrative embodiment of the network environment 100 of FIG. 1A for mirroring network traffic and practicing the operations of the present invention as described herein. In brief overview, the network environment 100 of FIG. 1B is configured to provide mirroring of network traffic between user 106a, i.e., user 1, and user 106b, i.e., user 2 via the network device 110b. Additionally, network environment 100 is configured to provide network traffic mirroring between user 106c, i.e., user 3, and user 106d, i.e., user 4, via network devices 110a and 110c.

For network traffic mirroring between user 1 and user 2, the network traffic mirroring may be performed remotely via mirror source point 120a of network device 110b and mirror destination point 122a of analyzer 105a. For network traffic mirroring between user 3 and user 4, the network traffic mirroring may be performed remotely via mirror source point 120b of network device 110b and mirror destination point 122b of network device 110n. Additionally, the network device 110n is configured to mirror local traffic to analyzer 105n.

Although FIG. 1B depicts these illustrative network traffic mirroring configurations, one ordinarily skilled in the art will recognize and appreciate that any other types of network traffic mirroring may have been configured or established via any of the network devices 110a-110n and/or traverse any network communication links 107, 108 of the embodiment of the network environment 100.

A mirror source point 120a-120b may comprise a mirror sender device or a mirror sending mechanism and/or means of any network device 110a-110n and may be implemented as software, hardware, or any combination thereof. In one embodiment, the mirror source point 120a-120b comprises or is associated with a port or a port of port module configurable to be a mirror port. A mirror port may be configured to copy all or a portion of network traffic, such as on a frame by per frame basis, transmitted and/or received on a given port of a network device 110a-110n to another port on the same device 110a-110n. The mirror source point 120a-120b may comprise or be considered a function of a portion of the network device 110a-110n providing the mirror port or a replicating, duplicating, or otherwise network traffic copying service. In another aspect, the mirror source point 120a-120b identifies the point or location of a network device 110a-110n, such as a port, queue, storage, or memory location, from which the mirroring of network traffic originates, initiates, or otherwise starts. Additionally, in other embodiments, the mirror source point 120a-120b may implement any of the data privacy techniques of the present invention. For example, the mirror source point 120a-120b may comprise any suitable means and/or mechanisms to encrypt, encapsulate, blank, scramble, or shave a frame of mirrored network traffic as will be discussed in further detail below.

A mirror destination point 122a-122b may comprise a mirror receiver device or a mirror receiving mechanism and/or means of any network device 110a-110n and may be implemented as software, hardware, or any combination thereof. In one embodiment, the mirror destination point 122a-122b comprises or is associated with a port or a port of port module of a network device 110a-110n or analyzer 105a-105n configurable to receive mirrored network traffic. The mirror destination point 122a-122b may comprise or be considered a function of a portion of the network device 110a-110n or analyzer 105a-105n receiving mirrored network traffic as known to those ordinarily skilled in the art. In another aspect, the mirror destination point 122a-122b identifies the point or location of a network device 110a-110n or analyzer 105a-105n, such as a port, from which the mirroring of network traffic terminates, completes, or otherwise ends. Moreover, the mirror destination point 122a-122b may be on the same network device 110a-110b as the mirror source point 120a-120b, or on a different network device 110a-110n in practicing the operations of the present described herein. For example, the mirror destination point 122a-122b may be associated with a port of a network device 110a-110n also having a corresponding mirror source point 120a-120b or another mirror source point 120a-120b.

Additionally, in other embodiments, the mirror destination point 122a-122b may implement any of the data privacy techniques of the present invention. For example, the mirror destination point 122a-122b may comprise any suitable means and/or mechanisms to decrypt, de-encapsulate, or unscramble a received frame of mirrored network traffic.

The data privacy techniques of the present invention may be used over any of the links 107, 108 and applied via any of the network devices 110a-110n between the mirror source point 120a-120b and the mirror destination point 122a-122b for network traffic mirroring between users 102a and 106b, and users 106c and 106d, respectively. In one embodiment, the data privacy techniques are applied at the mirror source point 120a-120b such that the mirroring communications provides data privacy when traversing the network links 107, 108 until the mirroring communications reaches the corresponding mirror destination point 122a-122b. In other embodiments, only a portion of the traversal route or path of the mirroring communications provides privacy of data using the data privacy techniques of the present invention.

As illustrated in FIG. 1B, the techniques of the present invention may be applied when the mirrored network traffic traverses the inter-network link 108. For example, the inter-network link 108 may traverse a public network, such as the Internet, and the remaining links 107 may be within a secure corporate network infrastructure. The mirroring communications 130a over link 108 may provide privacy of data for the mirrored network traffic, for example, by using an encrypted encapsulation data privacy technique. Network device 110c, for example, or mirror source point 120b, could apply the data privacy techniques of the present invention to mirrored network traffic of users 106a and 106b prior to communicating on the link 108. Likewise, network device 110d may provide data privacy of mirrored network traffic 130b prior communicated to network device 110n connected to the analyzer 105n. One ordinarily skilled in the art will recognize and appreciate that the data privacy techniques of the present invention may be applied or used by any network device 110a, 110b or analyzer 105a-105b during all or any portion of the mirroring communications between a mirror source point 120a-120n and a mirror destination point 122a-122n.

In one aspect, the present invention is directed towards using one or more techniques of providing data privacy for mirrored network traffic. The various data privacy techniques of the present invention will be described in conjunction with the network environment 200 of FIG. 2A with the illustrative method 250 of FIG. 2B. In brief overview, the network environment 200 of FIG. 2A includes an illustrative mirroring of network traffic from mirror source point 120a of network device 110b to mirror destination point 122a of network device 110c for network traffic 209 between users 106a and 106b, i.e., traffic between user 1 and 2, mirrored at network device 110b. The network environment 200 also includes illustrative mirroring of network traffic from mirror source point 120b of network device 110a to mirror destination point 122a of analyzer 105n for network traffic 209' between users 106b and 106c, i.e., traffic between user 2 and 3, mirrored at network device 110a. The mirrored network traffic 210, 210' of the network traffic 209, 209' provides privacy of data of the network traffic, including mirror communications over a public non-secure network 204 such as the Internet.

In operation, at steps 255 and 260 of the illustrative method 250 of the present invention, a mirror source point 120a-120b and mirror destination point 122a-122b is provided for mirroring network traffic. The mirror source point 120a-120n and the mirror destination point 122a-122b are provided by any suitable means and/or mechanisms for originating mirrored network traffic from one network device 110a-110b, sending the mirrored network traffic to a destination network device 110a-110n or analyzer 105a-105n, and receiving the mirrored network traffic at the destination network device 110a-110n or analyzer 105a-105n. One ordinarily skilled in the art will recognize and appreciate the various means and/or mechanisms for providing a mirror source point and mirror destination point for remote or local mirroring of network traffic.

At step 265 of illustrative method 250, the desired network traffic 209, 209' is mirrored at the provided mirror source point 120a-120b. In one embodiment, the network traffic 209, 209' received at a port of a network device 110a-110b is duplicated, replicated or copied and provided to the mirror source point 120a-120b. In another embodiment, the network traffic 209, 209' transmitted at a port of the network device 110a-110b is duplicated, replicated or copied and provided to the mirror source point 120a-120b. In a further embodiment, the network traffic 209, 209' transmitted and received at a port of the network device 110a-110b is duplicated, replicated or copied and provided to the mirror source point 120a-120b. In one embodiment, the network traffic 209, 209' is mirrored by copying each frame of the network traffic 209, 209' and providing each copied frame to the mirror source point 120a-120b.

In other embodiments, only a portion of each frame of network traffic 209, 209' is copied and provided to the mirror source point 120a-120b. In some embodiments, the portion of each frame of network traffic 209, 209' to be copied may be configurable at the network device 110a-110n providing the mirror source point 120a-120n. Additionally, the portion of a frame of network traffic 209, 209' to be mirrored may be configured to be any granularity of the frame of the network traffic 209, 209'. For example, one or more fields of one or more protocol layers of the frame may be configured to be mirrored. In another example, only the data payload of one of the protocol layers of the frame may be mirrored. One ordinarily skilled in the art will recognize and appreciate that all or any portion of network traffic, such as all or any portion of a frame, a packet, or any other protocol data unit, at one or more network protocol layers may be mirrored in practicing the operations of the present invention described herein.

Although the present invention is generally discussed in relation to frames of network traffic, one ordinarily skilled in the art will recognize and appreciate that a frame is a bundle or unit of data, that may be in binary form, organized in a specific way for transmission. Moreover, one ordinarily skilled in the art will recognize and appreciate that any unit or bundle of data associated with any of the protocol layers may be used in practicing the operations of the present invention as described herein.

Furthermore, any portion of the network traffic 209, 209' may be considered secret, classified, confidential, privileged, private, or otherwise sensitive. Additionally, any portion of the network traffic 209, 209' may be associated with a level of one or more levels of secrecy, classification, or confidentiality, such as the classification of information used by the United States Government and known to those ordinarily skilled in the art. For example, the data may be top secret, secret, confidential, restricted, or unclassified. It may be desirable to keep the portion of the network traffic 209, 209' private or otherwise provide privacy for the portion of network traffic mirrored from a mirror source point 120a-120b to a mirror destination point 122a-122b. At step 265 of illustrative method 250, the present invention performs one or more data privacy techniques to alter, transform, modify, or otherwise change the mirrored network traffic 209, 209' in a manner to provide data privacy for at least a portion of the mirrored network traffic 210, 210' while providing the desired mirroring functionality.

In an exemplary embodiment, the present invention may perform at illustrative step 265 one or more of the following techniques, including any alternatives, variations, and modifications thereto: 1) encrypted tunneling/encapsulation, 2) mirrored frame encryption (partial frame encryption), 3) frame data blanking/scrambling, and 4) frame data shaving. These techniques and various embodiments of the techniques will be discussed in further detail below in conjunction with FIGS. 3A-3B, 4A-4B, 5A-5B, and 6A-6B.

Step 265 of illustrative method 250 may be performed at any point in the traversal of mirrored network traffic communications between the mirror source point 120a-120b and the mirror destination point 122a-122b. In one embodiment, data privacy of the mirrored network traffic 109, 109', is provided at, in or by the network device 110a-110n associated with the mirror source point 120a-120b. In other embodiments, data privacy of the mirrored network traffic 109, 109', is provided at, in or by another network device 110a-110n along one or more of the traversal routes for mirroring communications to the mirror destination point 122a-122b. For example, the mirrored network traffic may be processed with any of the data privacy techniques of the present invention prior to communicating over the public network 204. In some cases, mirrored network traffic 210, 210' processed to have data privacy may be provided for the entire route of the mirroring from mirror source point 120a-120b to mirror destination point 122a-122b. In other cases, mirrored network traffic 210, 210' may be processed in a manner to provide data privacy during a portion of mirroring from mirror source point 120a-120b to mirror destination point 122a-122b.

At step 270, the illustrative method 250 of the present invention provides mirroring communications between the mirror source point 120a-120b and the mirror destination point 122a-122b. The mirrored network traffic 210, 210' processed to have data privacy in accordance with step 265 is communicated to the mirror destination point 122a-122b. The mirrored network traffic 210, 210' may be communicated from the mirror source point 120a-120b to the mirror destination point 122a-122b. In one embodiment, the mirrored network traffic 210, 210' may traverse a local network system to a mirror destination point 122a-122b. In another embodiment, the mirrored network traffic 210, 210' may traverse one or more network devices 110a-110n, network entry devices, network segments, transmissions mediums, and networks 204, public or private, or the Internet. At illustrative step 275, the mirror destination point 122a-122b receives and processes the mirrored network traffic 210, 210' in accordance with the data privacy technique applied to the mirrored network traffic 210, 210'.

Figure 2A:
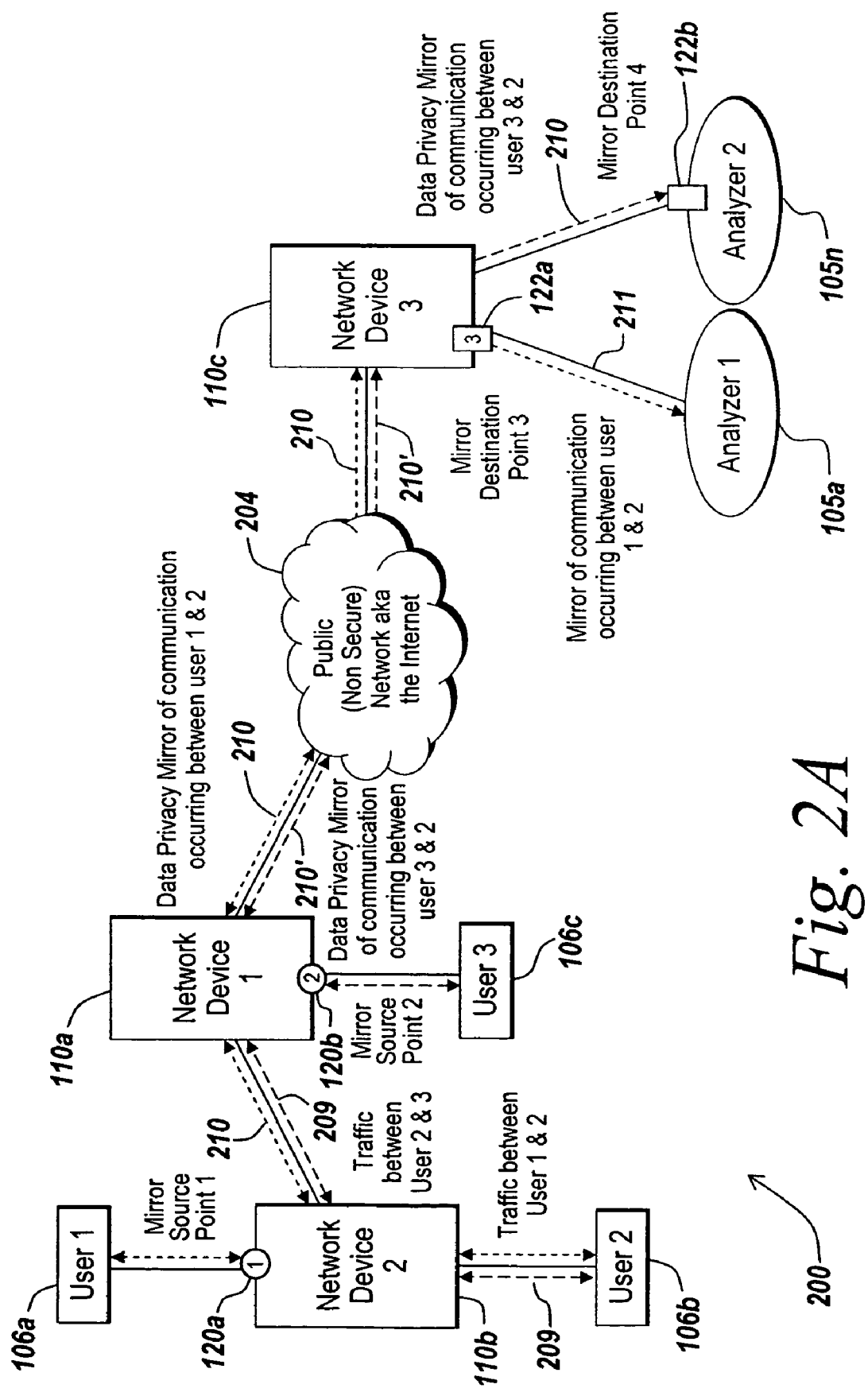
FIG. 2A is a block diagram of an illustrative network environment for practicing an embodiment of a data privacy technique of the present invention.

At step 280 of the illustrative method 250, the mirror destination point 122a-122b provides the mirrored network traffic 211 for review, analysis, storage or any other desired purpose. For example, as illustrated in FIG. 2A, the mirrored network traffic 211 may be provided to an analyzer 105a connected to the port or mirror destination point 122a of the network device 110c. In another example, the mirrored network traffic 211 may be provided to a wiretapping device or for wiretapping purposes associated with VoIP communications.

Figure 2B:
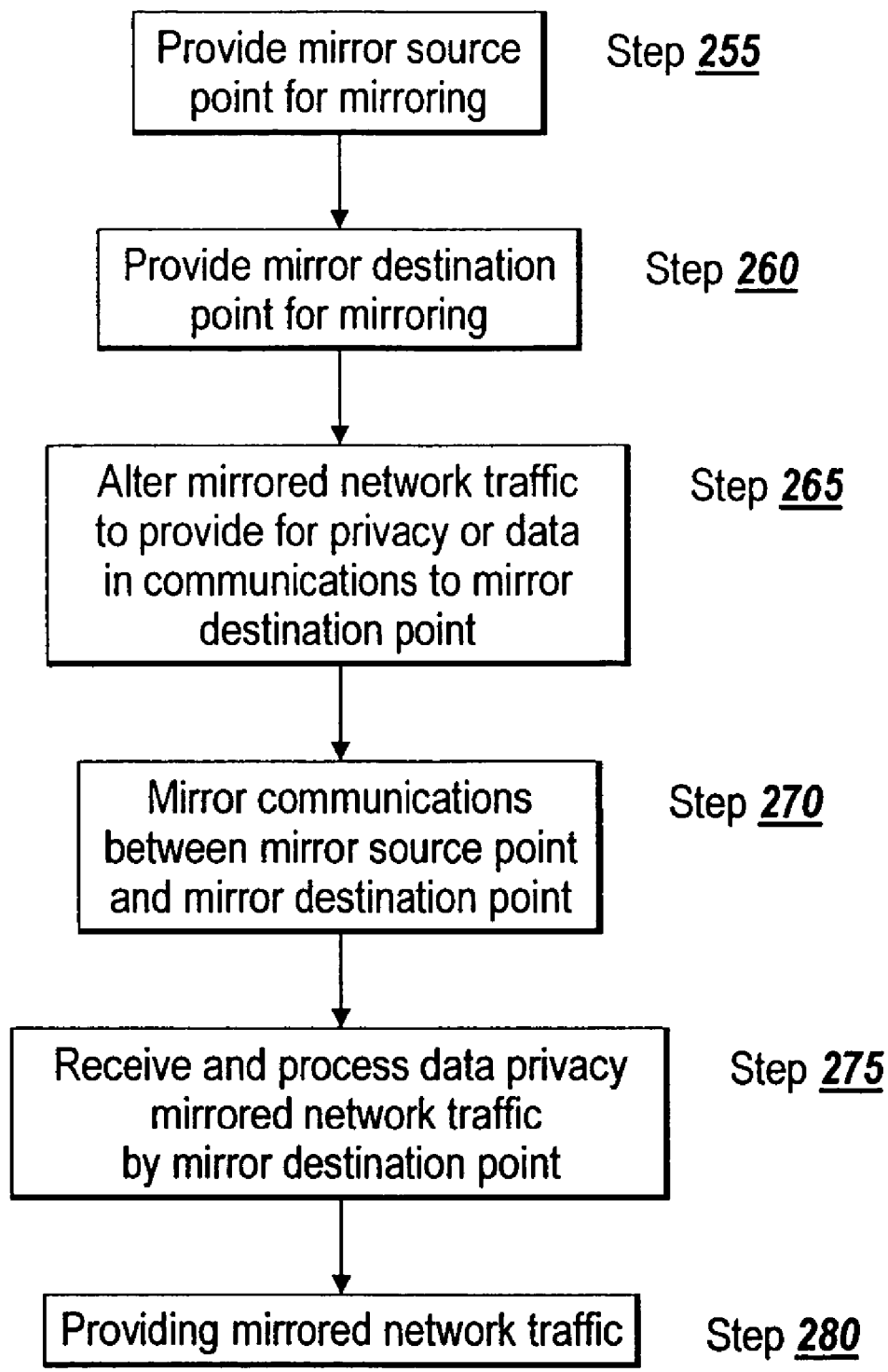
FIG. 2B is a flow diagram depicting an illustrative method for practicing an embodiment of a data privacy technique of the present invention with the illustrative network environment of FIG. 2A.
Figure 3A:
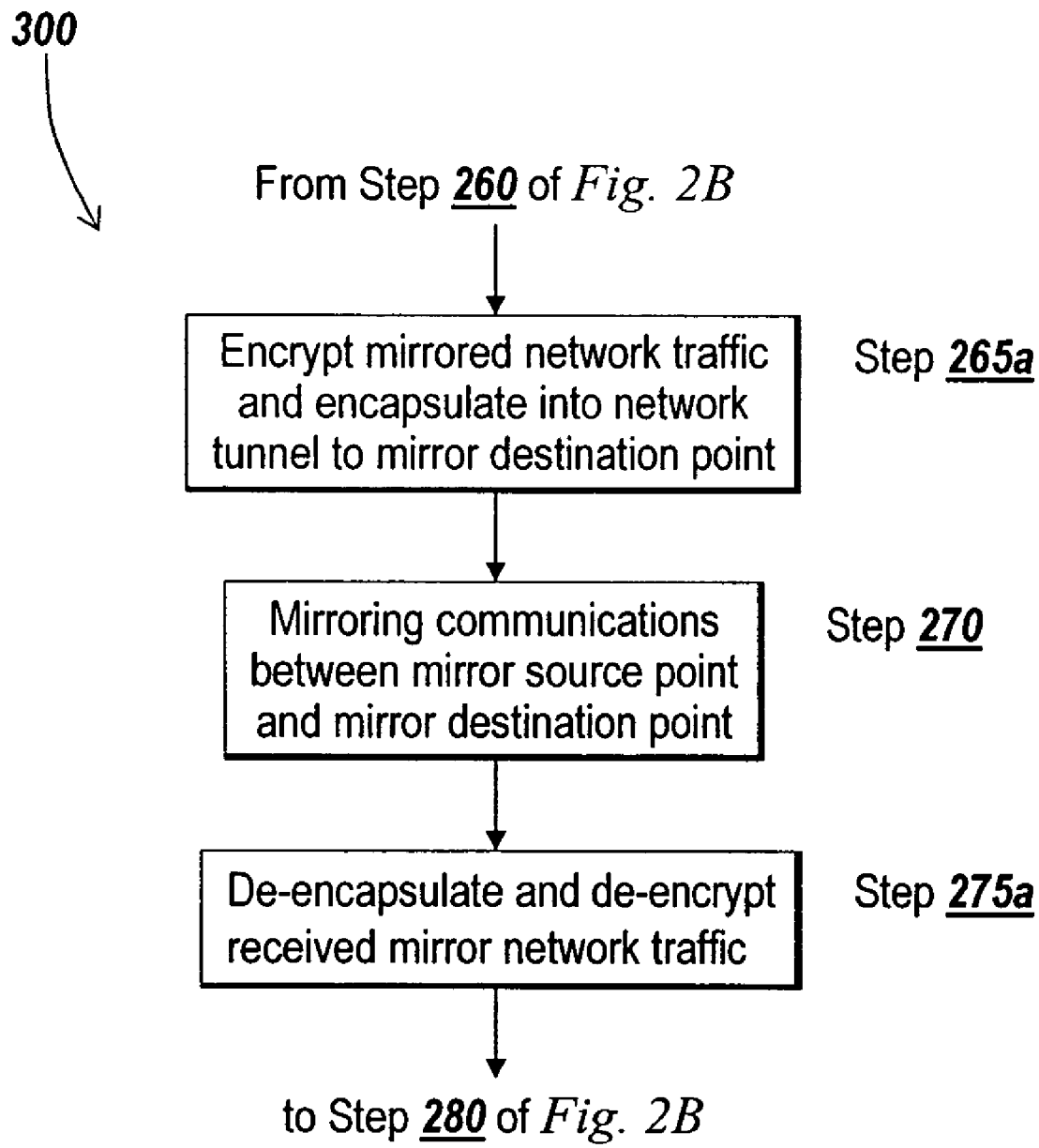
FIG. 3A is a flow diagram depicting an illustrative method for practicing an embodiment of an encryption and encapsulation data privacy technique of the present invention with the illustrative network environment of FIG. 2A and illustrative method of FIG. 2B.

In view of the illustrative network environment 200 of FIG. 2A and the illustrative method 250 of FIG. 2B, the various data privacy techniques of the present invention will be described. In one aspect, the present invention is directed towards a technique of encrypting and encapsulating the mirrored network traffic 209, 209' to provide mirrored network traffic 210, 210' having data privacy. FIG. 3A depicts an illustrative method 300 of an encryption and encapsulation data privacy technique. At step 265a of illustrative method 300, the mirrored network traffic 209, 209, provided to the mirror source point 120a-120b is processed to provide for the privacy of data of the network traffic 209, 209' to be mirrored by encrypting the mirrored network traffic and encapsulating the encrypted mirrored network traffic using an encapsulating or tunneling protocol. Each frame of the mirrored network traffic 209, 209' may be encrypted and the encrypted frame encapsulated for communicating to the mirror destination point 122a-122b.

For encrypting the mirrored network traffic at step 265a of the illustrative method 300, any type and/or form of encryption and any means and/or mechanisms for encrypting may be used. In one embodiment, the encryption comprises a private key or symmetric key cryptography. For example, a single key may be used for both encryption and decryption. In another embodiment, public key or asymmetric cryptography may be used for encryption. For example, two distinct but mathematically related keys may be used. A first key may be a public key that is not a secret and can be shared with others. The public key may be used to encrypt mirrored network traffic meant for the owner, such as the mirror destination point 122a-122b of a second key, which is a private key. The secret second key may be used to decrypt any messages encrypted by the public key.

In other embodiments, illustrative step 265a of the present invention encrypts the mirrored network traffic 209, 209' and/or the key used to encrypt the mirrored network traffic with any type and/or form of authentication credentials. For example, a user id and/or password may be used as authentication credentials. In other embodiments, the mirrored network traffic is encrypted by any type and/or form of algorithm, function, or mathematical operation, such as a "Caesar Cipher" encryption, or a hash function, such as MD4, MD5, or SHA-1. Additionally, any type of strength and/or quality of encryption may be used. In one embodiment, a key length of any size, such as 512, 716, or 1024 bits may be used for symmetrical type encryption. In another embodiment, keys lengths of 40, 56, 128, 512, 768, or 1024 bits may be used asymmetrical encryption key lengths. One ordinarily skilled in the art will recognize and appreciate the various types, forms, strengths and quality of encryption that may be used in practicing the present invention.

Additionally, at step 265a of illustrative method 300, the mirrored network traffic or the encrypted mirrored network traffic may be compressed before encapsulation via a protocol for communicating to the mirror destination point 122a-122b. Any type and/or form of compression algorithm may be used for compressing mirrored network traffic, such as frame of network traffic or any portion thereof. For example, the type of compression may be a lossless alogorithm such as a flate/deflate compression based on an LZW or Haufmann compression. In another example, the type of compression may be a lossly algorithm such as a JPEG compression. One ordinarily skilled in the art will appreciate the various types and/or forms of compression that may be used in practicing the present invention.

For encapsulating the mirrored network traffic at step 265a of the illustrative method 300, any type and/or form of protocol and any means and/or mechanisms for encapsulation may be used. In some embodiments, the encrypted mirrored network traffic may be encapsulated using a tunneling protocol, such as a secure tunneling protocol. For example, the tunneling protocol used by the present invention may include any version and/or implementation of any of the following tunneling protocols: a Point-To-Point Tunneling protocol (PPTP), Point-To-Point Protocol over Ethernet (PPPoE), Point-To-Point Protocol over ATM (PPPoA), a Layer 2 Tunneling Protocol (L2TP), a Generic Routing Encapsulation (GRE), Internet Protocol Security (IPsec), IP in IP Tunneling, and Multi-Protocol Label Switching (MPLS). One ordinarily skilled in the art will recognize and appreciate that any bridgeable or routable protocol may be used in practicing the operations of the present invention described herein.

Figure 3B:
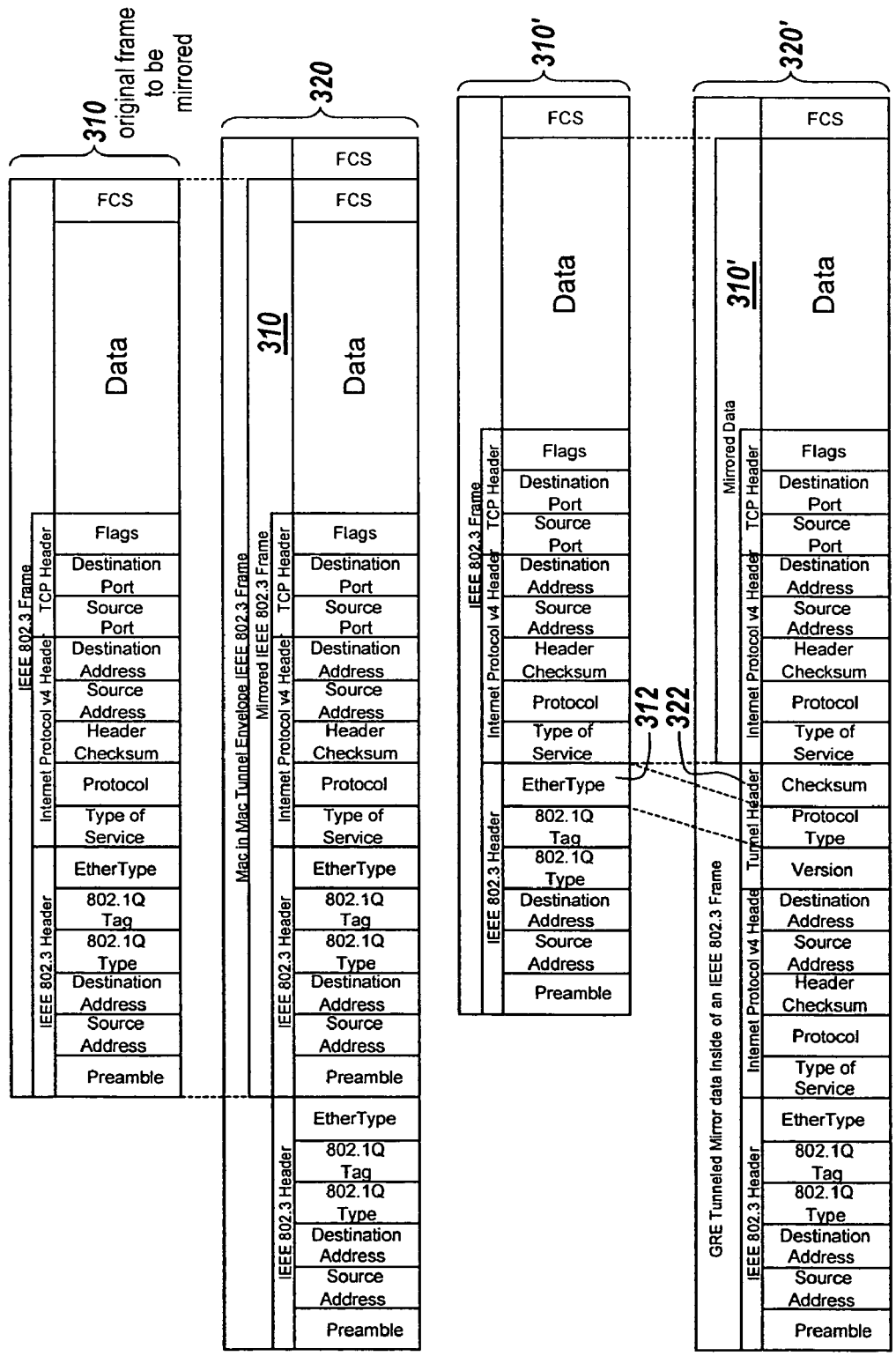
FIG. 3B depicts illustrative frames of mirrored network traffic for practicing an embodiment of the encryption and encapsulation data privacy technique of the present invention illustrated in FIG. 3A.

Referring to FIG. 3B, an illustrative example of a frame of network traffic 209, 209' altered, transformed, modified, or processed in accordance with the data privacy technique of illustrative method 300 is depicted. In the second example of FIG. 3B, an original frame 310' of network traffic 209, 209' is encapsulated with a GRE tunneling protocol to form a modified frame 320' for mirroring. As depicted in the modified frame 320, one or more additional headers and/or fields related to the encapsulation or tunneling protocol may be appended to the original frame 310'. In one embodiment, the mirrored data 310' becomes the data payload for the modified frame 320'. Additionally, the EtherType field 312 of the IEEE 802.3 header of the original frame 310' may be used to provide a portion of a tunnel header 322 of the modified frame 320'. For example, the EtherType may indicate the type of protocol of the original frame 310'. The tunnel header 322 of the modified frame 320' may have a field used to indicate the type of protocol used by the data payload of the encapsulated mirrored frame 310'. Furthermore, in some embodiments, the encapsulating or tunneling protocol provides for encryption of the frames of mirrored network traffic. For example, the payload data 310' of the modified frame 320' may be encrypted. In other embodiments, the payload data 310' of the modified frame 320' may be encrypted prior to encapsulation or tunneling.

In other embodiments of step 265a of illustrative method 300, the encrypted network traffic is tunneled to the mirror destination point 122a-113b via a higher level protocol, such as HyperText Transfer Protocol Secure (HTTPS) or the Secure Socket Layer (SSL) protocol. For example, the mirrored network traffic 210, 210' may be encrypted and encapsulated via a secure web session using SSL and/or HTTP between the mirror source point 120a-120b and the mirror destination point 122a-122b.

In one embodiment, a Medium Access Control (MAC) Layer 2 tunneling may be used. A MAC-in-MAC tunneling techniques encapsulates a MAC frame with another MAC header, or a second MAC header. Referring to FIG. 3B, an illustrative example of a frame of network traffic 209, 209' altered, transformed, modified, or processed in accordance with the data privacy technique of illustrative method 300 is depicted. In the first example of FIG. 3B, an original frame 310 of network traffic 209, 209' is encapsulated in a MAC-in-MAC tunneling protocol. As depicted in FIG. 3B, a second IEEE 802.3 header is appended to the original frame 310 to form the modified frame 320 having data privacy. In some embodiments, all or a portion of the MAC frame encapsulated with a second MAC header may be encrypted. For example, the data portion of the encapsulated frame 320 may be encrypted.

Additionally, the encryption and encapsulation data privacy technique of mirrored network traffic may be used with virtual leased line technologies and/or the Multiple Protocol Label Switching Standards, such as the Pseudo Wire Emulation Version 3 standard (PWE3). Furthermore, any type and/or form of custom or proprietary encapsulation protocol, or any type and/or form of custom or proprietary encrypting and encapsulating protocol may be used by illustrative method 250 of the present invention. One ordinarily skilled in the art will recognize and appreciate the various types and/or forms of encapsulating or tunneling protocols that may be used for providing data privacy of at least a portion of mirrored network traffic during communications between the mirror source point and the mirror destination point.

At step 270 of the illustrative method 300, the mirror destination point 122a-122b receives the encapsulated and encrypted mirrored network traffic 210, 210', and at step 275a the encapsulated and encrypted mirrored network traffic 210, 210' is de-encapsulated or un-tunneled and then decrypted. In some embodiments, the mirror destination point 122a-122b comprises any type and/or form of means and/or mechanism to de-encapsulate the encapsulated mirrored network traffic 210, 210' and decrypt the encrypted portion of the mirrored network traffic 210, 210'. In another embodiment, the mirror destination 122a-122n may have access to and be in communication with or interfaced to another device, mechanism, or system to provide for the de-encapsulation and decryption of the mirrored network traffic 210, 210'. Via de-encapsulation and decryption of the frames 320, 320', the mirror destination point 122a-122b provides a copy of the original frame 310 or any portion thereof.

Figure 4A:
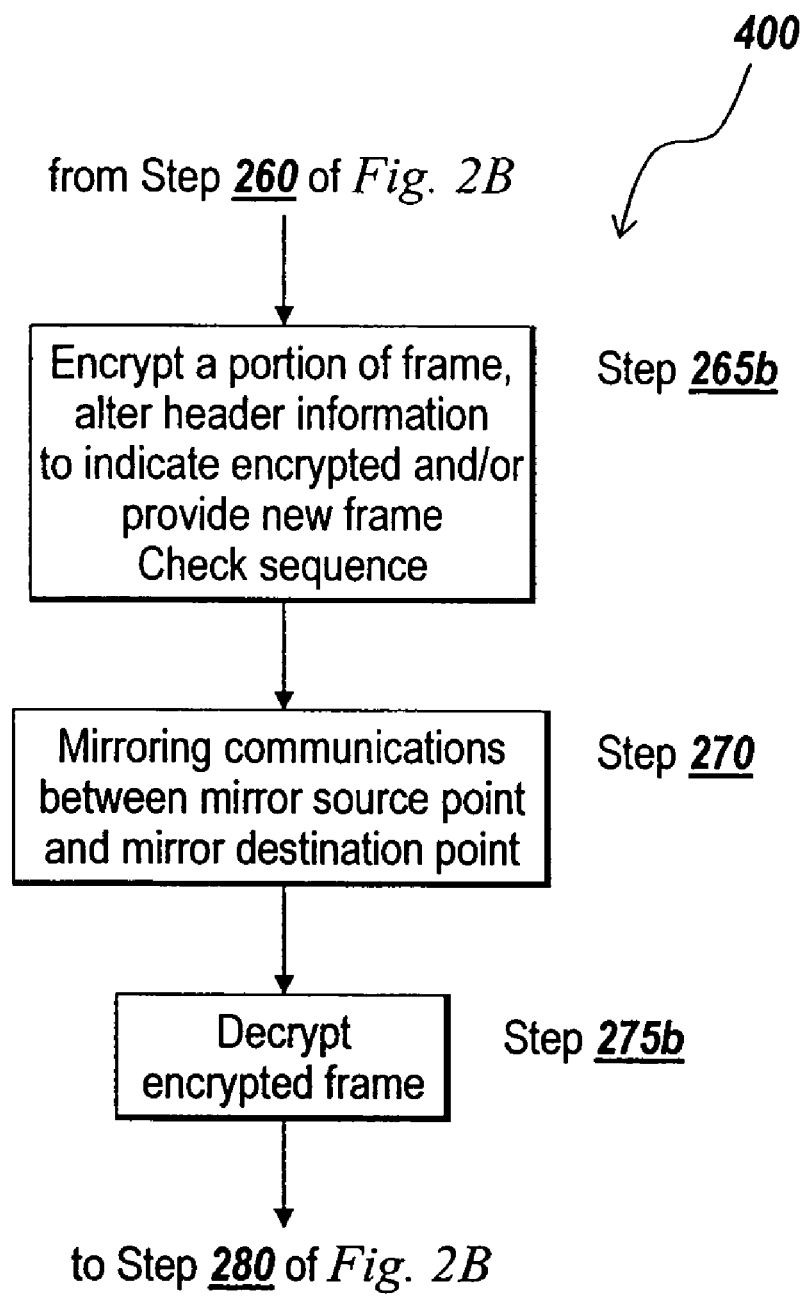
FIG. 4A is a flow diagram depicting an illustrative method for practicing an embodiment of an frame encryption data privacy technique of the present invention with the illustrative network environment of FIG. 2A and illustrative method of FIG. 2B.
Figure 4B:
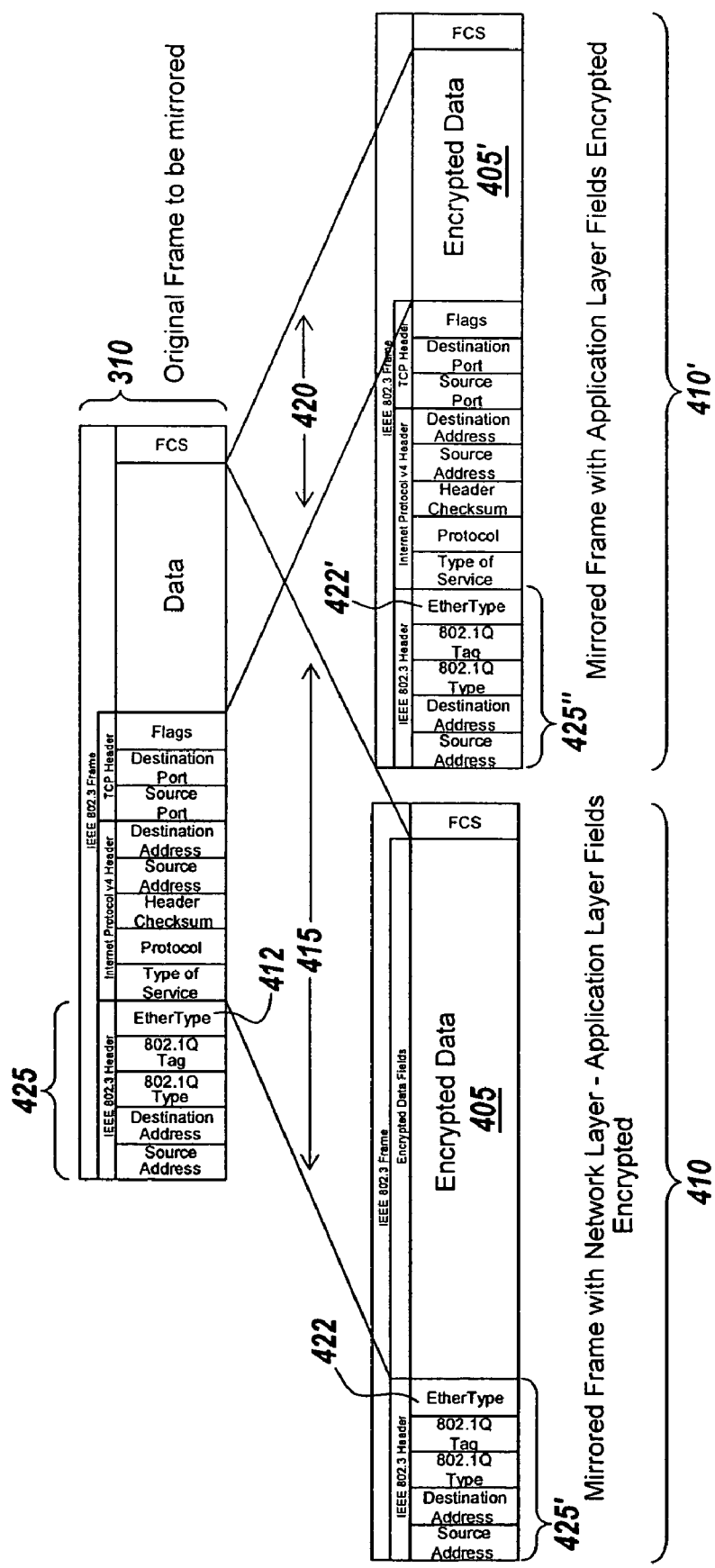
FIG. 4B depicts illustrative frames of mirrored network traffic for practicing an embodiment of the frame encryption data privacy technique of the present invention illustrated in FIG. 4A.

In another aspect, the present invention is directed towards a technique of partially encrypting frames of the mirrored network traffic 209, 209' to provide mirrored network traffic 210, 210' having data privacy. FIG. 4A depicts an illustrative method 400 of a frame encryption data privacy technique providing partially encrypted frames as illustrated in FIG. 4B. At step 265b of illustrative method 400, the mirrored network traffic 209, 209, provided to the mirror source point 120a-120b is processed to provide for the privacy of data of the mirrored network traffic 209, 209' by encrypting a portion of the frame. Each frame of the mirrored network traffic 209, 209' may be partially encrypted for communicating to the mirror destination point 122a-122b.

The frame encryption data privacy technique of illustrative method 400 may be used for remote mirroring methods and systems that do not encapsulate or tunnel the mirrored network traffic. In some embodiments of the present invention, network devices 110a-110n may support the ability to mirror network traffic remotely over a network by utilizing the IEEE 802.1Q VLAN tag/field of the frame in a virtual LAN environment (VLAN). VLAN environments are based on logical connectivity instead of physical connections, and as known to those ordinarily skilled in the art, may include any type of VLAN, such as a port-based VLAN, MAC-based VLAN, a protocol-based VLAN, or an ATM VLAN. In a VLAN environment, remotely mirrored network traffic may have a specific IEEE 802.1Q VLAN tag the network devices 110a-110n on the network have been configured to direct the mirrored network traffic to specified portions. Utilizing the VLAN tag, the frame relay logic of the network device 110a-110n typically used for forwarding frames is bypassed. Network traffic mirrored in a VLAN environment may traverse or pass through many network devices 110a-110n before reaching the mirror destination point 122a-122b.

For encrypting a portion of the frame of the mirrored network traffic at step 265b of illustrative method 400, any type and/or form of encryption and any means and/or mechanism for encrypting may be used as discussed above in conjunction with illustrative method 300 of FIG. 3A. Additionally, any portion of the original frame 310 to be mirrored may be encrypted as depicted in FIG. 4B. In one embodiment, the content or value of fields comprising or identifying the network layer through application layer portion 415 of the frame 310 may be encrypted to form the encrypted data 405 payload of the partially encrypted frame 410 for data privacy mirroring. The data link header 425 portion of the frame 310, i.e., the IEEE 802.3 header at the beginning of the frame, may or may not be modified in the partially encrypted frame 410. In some embodiments, the value of source and destination address fields of the data link layer header 425' of the partially encrypted frame 410 are the same as the source and destination address fields of the data link layer header 425 of the original frame 310. In other embodiments, the data link layer header 425' may be modified to indicate the data payload 405 has been encrypted. For example, in one embodiment, a new EtherType value 422 is inserted into the data link layer header 425' to indicate that the frame 410 is a partially encrypted frame. In other embodiment, the EtherType value 412 of the original frame 310 is used in the EtherType field 422 of the partially encrypted frame 410 or is inserted in a header of the application layer through network layer portion 415 of the frame 410.

In another embodiment, the present invention at illustrative step 265b of method 400 encrypts the contents or values of fields 420 beyond the network and transport layers of the frame 310 to form the encrypted data 405' payload of the partially encrypted frame 410' for data privacy mirroring. As discussed above, the EtherType field 422' of the data link layer header 425" may comprise a new EtherType value to indicate the frame has been partially encrypted and the EtherType value 412 of the original frame 310 may be inserted in a header of another protocol layer. Providing the original EtherType value 412 of the original frame 310 in the mirrored encrypted frame 410, 410' facilitates the analysis of the original frame 310 when the mirrored encrypted frame 410, 410' is decrypted. One ordinarily skilled in the art will recognize and appreciate that any portion of the original frame 310, such as content or a value of one or more fields or any data of the frame, or any portion thereof, may be encrypted to form a partially encrypted frame 310, 310.

Step 265b of illustrative method 400 may change the contents of the original frame 310 via encryption to form the encrypted data 405, 405'. In some embodiments, frames 310, 410, or 410' may utilize a frame check sequence/cyclic redundancy check as part of the data link protocol. Due to the encrypted data 405, 405' changing contents of the original frame 310, a new frame check sequence of the partially encrypted frame 410, 410' may be generated or otherwise provided at step 265b. Additionally, some network layer protocols include one or more fields that provide cyclic redundancy check and length indications. In other embodiments, the cyclic redundancy check and length indication fields may be recalculated and provided in the partially encrypted frames 410, 410'. Any field of the partially encrypted frame 410, 410' may be recalculated or a new value provided so that the frame 410' 410" is not considered defective by the mirror destination point 122a-112b, or any mirror receiving device, such as an analyzer 105a-105n. Furthermore, any field of the partially encrypted frame 410, 410' may be recalculated or a new value provided so that the frame 410' 410" may be communicate via any route to the mirror destination point 122b.

At step 270 of the illustrative method 500, the mirror destination point 122a-122b receives the partially encrypted frames of the mirrored network traffic 210, 210', and at step 275b, the mirrored network traffic 210, 210' is decrypted. In some embodiments, the mirror destination point 122a-122b comprises any type and/or form of means and/or mechanism to decrypt the partially encrypted frames 410, 410' of the mirrored network traffic 210, 210'. In another embodiment, the mirror destination point 122a-122b may have access to and be in communication with or interfaced to another device, mechanism, or system to provide for the decryption of the mirrored network traffic 210, 210'. Via decryption of the partially encrypted frame 410, 410', the mirror destination point 122a-122b provides a copy of the original frame 310 or any portion thereof.

Figure 5A:
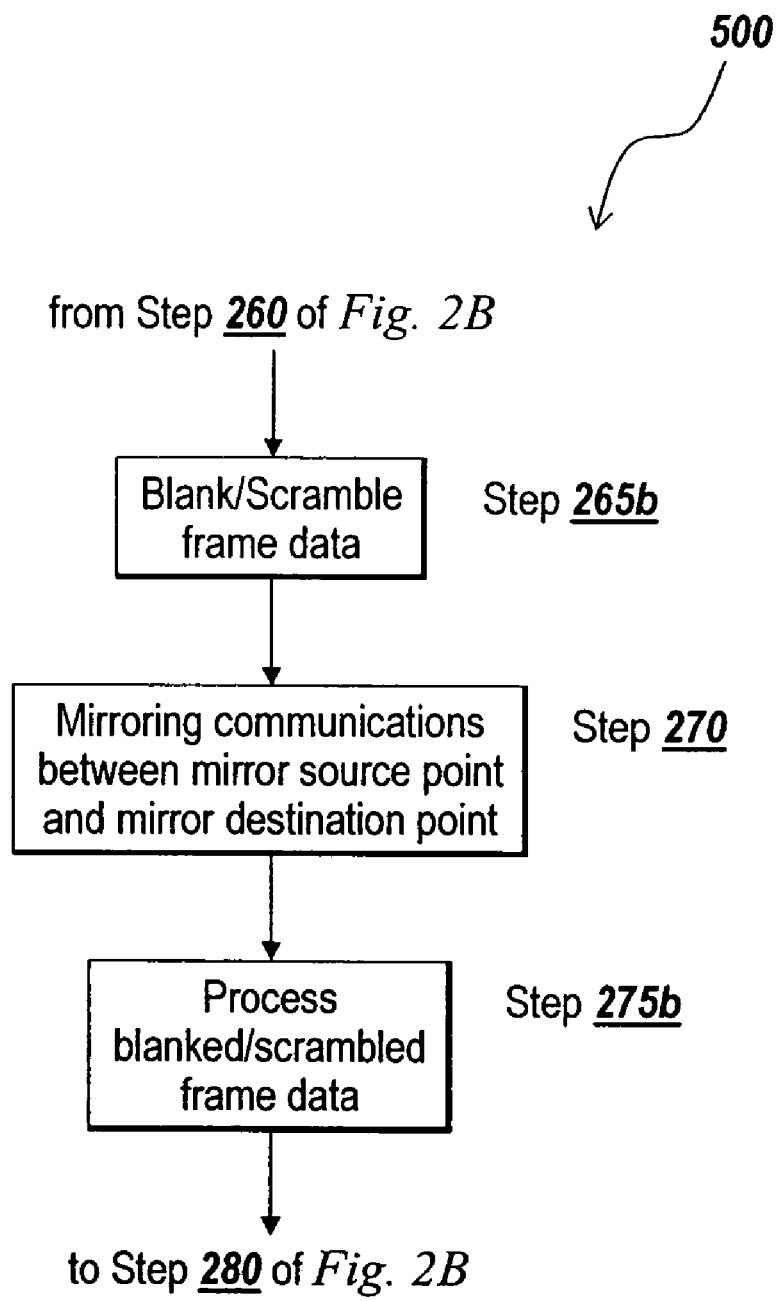
FIG. 5A is a flow diagram depicting an illustrative method for practicing an embodiment of a frame blanking/scrambling data privacy technique of the present invention with the illustrative network environment of FIG. 2A and illustrative method of FIG. 2B.
Figure 5B:
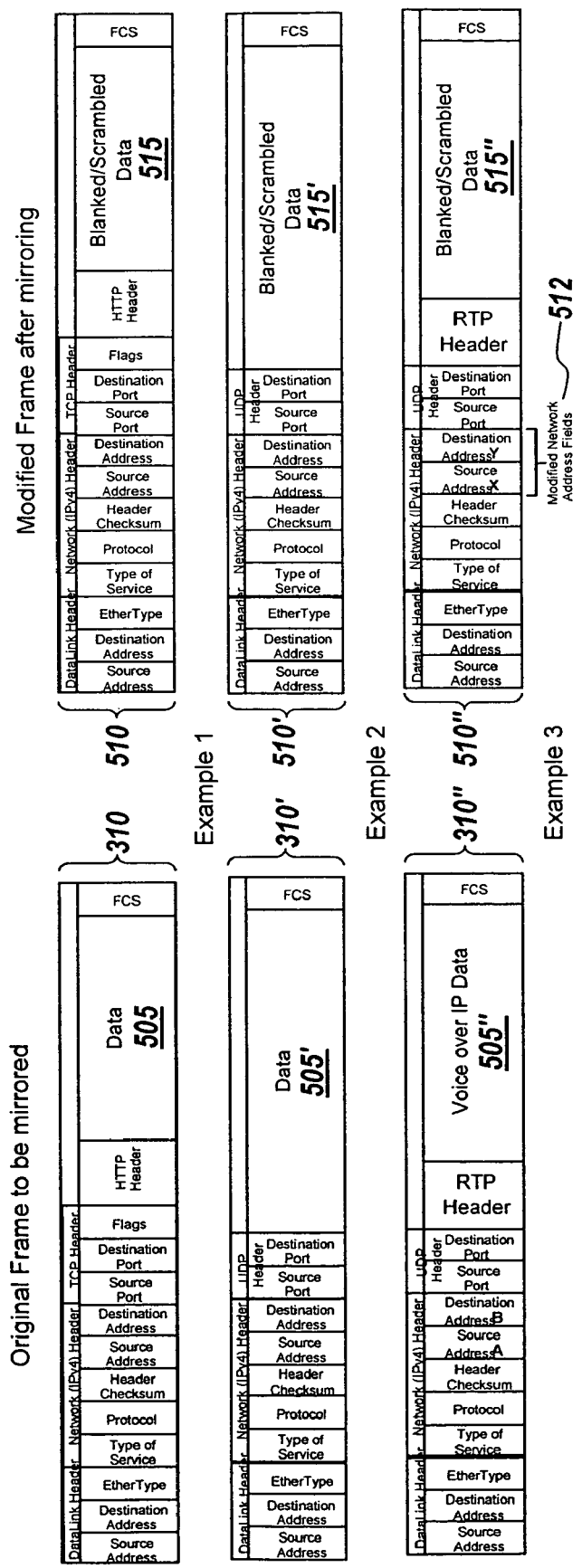
FIG. 5B depicts illustrative frames of mirrored network traffic for practicing an embodiment of the frame blanking/scrambling data privacy technique of the present invention illustrated in FIG. 5A.

In another aspect, the present invention is directed towards a technique of blanking and/or scrambling portions of frames of the mirrored network traffic 209, 209' to provide mirrored network traffic 210, 210' having data privacy. FIG. 5A depicts an illustrative method 500 of a frame blanking/scrambling data privacy technique providing mirror frames with blanked and/or scrambled data as illustrated in FIG. 5B. At step 265c of illustrative method 500, the mirrored network traffic 209, 209' provided to the mirror source point 120a-120b is processed to provide for the privacy of data of the network traffic 209, 209' to be mirrored by blanking and/or scrambling a portion of the frame. Each frame of the mirrored network traffic 209, 209' may be partially blanked and/or scrambled for communicating to the mirror destination point 122a-122b.

The technique of illustrative method 500 may be used in cases where it is not required to duplicate, copy or otherwise use the entire contents of the original frame 310 of network traffic 209, 209'. In some cases, a network analysis device, such as an analyzer 105a-150n, may not need to examine the contents of the entire frame 310 to trouble shoot a network that is experiencing an operational issue. In many cases of network trouble shooting, only the data link, network and transport/session layers of the network protocol are used for analysis. For example, to trouble shoot an HTTP transaction, a network analysis device may only need to review the data link header, the network layer header, the transport layer header and the HTTP protocol header portions of the frame 310. Since the fields of the headers are being used for analysis in these cases, any portion of the data payload, such as VoIP communications, of the frame may be blanked and/or scrambled.

In one embodiment, at step 265c of illustrative method 500, the data portion 505 or content of the original frame 310 to be mirrored is blanked to form a blanked data portion 515 of the modified frame 510 for mirroring as illustrated in FIG. 5B. As shown by Example 1 of FIG. 5B, the original frame 310 may comprise an HTTP transaction with an HTTP header and an HTTP related data payload 505. It may be desired that the data portion 505 of the frame be kept private. For example, it may comprise confidential information such as user authentication credentials, or private financial information. As it may not be needed for analysis of mirrored network traffic, the data 505 portion of the frame 310 can be blanked to form a blanked data portion 515 of the modified mirror frame 510.

The illustrative method 500 of the present invention may blank the data portion 505 of the original frame 310 to form a modified mirror frame 510 by any suitable type and/or form of means and/or mechanism. In one embodiment, a mirror source point 120a-120b or the network device 110a-110n of the mirror source point 120a-120b may perform the blanking of the data 505 to provide the data privacy of the network traffic 209, 209' to be mirrored. In other embodiments, any network device 110a-110n along the traversed route of mirroring communications to the mirror destination point 122a-122b may provide for the blanking of the data 505.

Any type and/or form of blanking or blanked data 515' may be used. In one embodiment, a random binary pattern is generated or otherwise provided to form the blanked data 515' of the modified mirror frame 510. In another embodiment, a predefined or otherwise previously determined binary pattern may be used to form the blanked data 515'. For example, a network device 110a-110n or a mirror source point 120a-120b may be configurable to have a user specified binary pattern for blanking the data 505. Additionally, the data 505 of the original frame 310 can be replaced with any type and/or form of data 515' in the modified frame 510 that is different than the original data 505. In some embodiments, the blanked data 515 may comprise valid or otherwise useful information. For example, a network address of the data 505 may be replaced with a false but valid address in the blanked data 515 of the modified mirror frame 510.

Additionally, any portion of the original frame 310 may be blanked, such as the content or value of any field of any header or any portion of the data payload 505 of the frame 310. For example, only a portion of the data payload 505 of the original frame 310 comprises data desired to be kept private. Some of the other portions of the data payload 505 may provide useful information for mirroring or for analyzing mirrored network traffic. In one embodiment, a portion of the data payload 505 is blanked to form the blanked data 515. In this case, the blanked data 515 may include some of the original data 505 and some banked data 515. One ordinarily skilled in the art will recognize and appreciate the various ways to blank any portion of a frame to form a modified mirror frame 510 to provide data privacy in accordance with the present invention.

In another embodiment, at step 265c of illustrative method 500, the present invention may scramble a portion of the original frame 310, such as the data portion 505, to form a scrambled portion 515 of a modified mirror frame 510. Scrambled data 515 is generated or otherwise provided by performing a mathematical operation, function, or algorithm on the data 505, or a copy of the data 505. The network device 110a-110n of the mirror source point 120a-120b, the mirror source point 120a-120b, or any network device 110a-110n of the mirroring communications route may perform the scrambling of the data 505 to provide the data privacy of the network traffic 209, 209' to be mirrored.

The data portion 505 of the original frame 310 to form a modified mirror frame 510 may be scrambled by any suitable type and/or form of means and/or mechanism. Furthermore, any type and/or form of mathematical operation, function, or algorithm may be used to scramble the data 505. In one embodiment, the data portion 505 may be scrambled by a mathematical operation so that the scrambled data 515 may not be unscrambled when received at the mirror destination point 122a-122b or if accessed at any time during mirroring communications. In another embodiment, the data portion 505 may be scrambled in such a manner so that a receiver of such data may unscramble the scrambled data 515. For example, a network operator or law enforcement official may be able to recover the original data 505 from the unscrambled data 515 of the modified mirror frame received at or provided by the mirror destination point 122a-122b. A mathematical operation, function, or algorithm may be executed to reverse the scrambling or otherwise unscramble the scrambled data 515.

In some embodiments, the scrambling and/or unscrambling algorithm may be known and used by authorized or desired persons. In other embodiments, the scrambling and/or unscrambling algorithm is exchanged between desired persons by any type and/or form of suitable security means and/or mechanism. In one embodiment, the mirror source point 120a-120b, the mirror destination point 122a-122b or any related network device 110a-110n may be configured to provide a specified scrambling and/or unscrambling algorithm. For example, the scrambling algorithm may be specified or configured by a user for a network device 110a-110n having the mirror source point 120a-120b. Likewise, the reversing or unscrambling algorithm may be specified or configured by a user for a network device 110a-110n or analyzer 105a-105n having the mirror destination point 122a-122b.

In other embodiments of the blanking/scrambling data privacy technique of illustrative method 500, the present invention blanks and/or scrambles a portion of the frame determined by statically or dynamically defined offsets into the frame 310. For example, a mirroring network device 110a-110n may be configured by a device operator to blank or scramble all data in the frame after the $68^{th}$ byte as measured from the beginning of the Data Link header. In another example, the network device 110a-110n may be configured to blank the source and destination fields and blank/scramble data 40 bytes from the beginning of the network layer header.

By way of example, at step 265c of the illustrative method 500, statically defined offsets may be used to alter or otherwise provide the modified mirror frame 510, 510' from the original frame 310, 310' as depicted in example 1 and example 2 of FIG. 5B. In the statically defined offset variation of the blanking/scrambling data privacy technique, a network device 110a-110n may dynamically blank/scramble portions of a mirrored frame by analyzing the protocol headers of the frame 310, 310'. In some embodiments, a network device 110a-110n providing mirroring functionality may classify frames 310 to be mirrored based on one or more protocol fields. The network device 110a-110n may perform any level of protocol layer discovery and use any protocol header information available in the frame 310 to determine the type of one or more protocols identified by the frame 310. For each of the protocol types that may be discovered or determined by the mirroring network device 110a-110n, a banking/scrambling offset may be specified and associated with the protocol type. In some embodiments, the banking/scrambling offsets and associated protocol types may be configured by an operator of the mirroring network device 110a-110n.

In example 1 of FIG. 5B, a mirroring network device 110a-110n may detect the frame 310 was a TCP/IP frame with a TCP destination port of 80, which may indicate that this frame was transporting HTTP data. The mirroring network device 110a-110n may be configured with an offset value that would allow the HTTP header of the modified mirror frame 510 to remain intact while the data 515 beyond the offset would be blanked or scrambled. In example 2 of FIG. 5B, the mirroring network device 110a-110n may recognize that the frame 310' to be mirrored is a UDP/IP frame. In the case, the mirroring network device 110a-110n may be configured with a blanking offset that instructs the mirroring network device 110a-110n to blank/scramble the data 515' beyond the end of the UDP header.

In another embodiment, step 265c of illustrative method 500 may use a dynamically defined offset variation of the blanking/scrambling data privacy technique. Using this technique, the mirroring network device 110a-110n is configured to analyze multiple traffic flows to understand the context of the frame 310 as well as an understanding of multiple protocols. Based on the context and multiple protocols, the mirroring network device 110a-110n can accurately and dynamically determine the portions of the mirror frame 510 to blank/scramble.

Example 3 depicted in FIG. 5B illustrates an example where the mirroring network device 110a-110n determines that the original frame 310 includes at least a portion of a VoIP communication session. The mirroring network device 110a-110n may recognize that the frame 310" was a UDP/IP frame carrying a Real Time Protocol (RTP) header with voice data. The mirroring network device 110a-110n would blank/scramble the frame after the end of the RTP header, as the RTP header may be desired for troubleshooting a VoIP network. In this example, the source and destination network layer addresses 512 may be changed to different addresses to mask the addresses of the original source and destination devices. In the case of VoIP, the original source and destination network layer addresses 512 may identify the location and users of the devices and thus, the participants of the VoIP communication session. As such, the original source and destination network layer addresses 512 may be desired to be kept private.

The offset determination can be dynamically determined by any type and/or form of suitable means and/or mechanism. In one embodiment, the mirroring network device 110a-110n may analyze the entire frame 310" to discover one or more of the protocols utilized by the frame 310". Based on the analysis, the mirroring network device 110a-110n may determine the portions 515" of the frame 510" that can be blanked/scrambled while still providing enough of the frame 310" to be useful in trouble shooting applications or otherwise for mirroring. The mirroring network device 110a-110n may be configured with functionality or logic, such as business rules, to dynamically determine the appropriate offset(s). In some embodiments, the mirroring network device 110a-110n may determine one or more offsets based on a type of protocol, type of data, type of transaction, or any other information identified by a header, field, or data of the frame 310". In other embodiments, the mirroring network device 110a-110n may use one or more configured offsets associated with a type of protocol, type of data, type of transaction, or any other information identified by a header, field, or data of the frame 310".

Although the examples above are generally discussed with a single offset, one ordinarily skilled in the art will recognize and appreciate that multiple offsets may be used in either the statically or dynamically defined offset techniques of the present invention described herein. For example, for a specified protocol type, two offsets may be associated with the protocol type to blank/scramble different portions of the frame 510, 510', 510" not adjacent to each other or otherwise contiguous.

Step 265c of illustrative method 500 may change the contents of the original frame 310 via blanking/scramble to form the blanked/scrambled data 505, 505'. In some embodiments, frames 310, 510, 510' or 510" may utilize a frame check sequence/cyclic redundancy check as part of the data link protocol. Due to the blanked/scrambled data 505, 505' changing contents of the original frame 310, a new frame check sequence of the modified mirror frame 510, 510', 510" may be generated or otherwise provided at step 265c. Additionally, some network layer protocols include one or more fields that provide cyclic redundancy check and length indications. In other embodiments, the cyclic redundancy check and length indication fields may be recalculated and provided in the modified mirror frame 510, 510', 510". A value of any field of the modified mirror frame 510, 510', 510" may be recalculated or a new value provided so that the frame 510, 510', 510" is not considered defective by the mirror destination point 122a-112b, or any mirror receiving device, such as an analyzer 105a-105n. Furthermore, a value of any field of the modified mirror frame 510, 510', 510" may be recalculated or a new value provided so that the frame 510, 510', 510" may be communicate via any route to the mirror destination point 122b.

At step 270 of the illustrative method 500, the mirror destination point 122a-122b receives the frames of the mirrored network traffic 210, 210' having scrambled/blanked data 515, and at step 275c, the mirrored network traffic 210, 210' is processed. In some embodiments, the blanked/scrambled portion 515 of the frame 510 may be ignored and the remaining portions of the frame 505 used. In other embodiments, the mirror destination point 122a-122b comprises any type and/or form of means and/or mechanism to unscramble the scrambled portion of the frames 510, 510', 510" of the mirrored network traffic 210, 210'. In another embodiment, the mirror destination point 122a-122b may have access to and be in communication with or interfaced to another device, mechanism, or system to provide for the unscrambling of the mirrored network traffic 210, 210'. Via processing of the partially blanked/scrambled frame 510, the mirror destination point 122a-122b provides a copy of the portion of the original frame 310 remaining intact. In some embodiments, the mirror destination point 122a-122b unscrambles the scrambled portion 515 to provide an entire copy of the original frame 310.

Figure 6A:
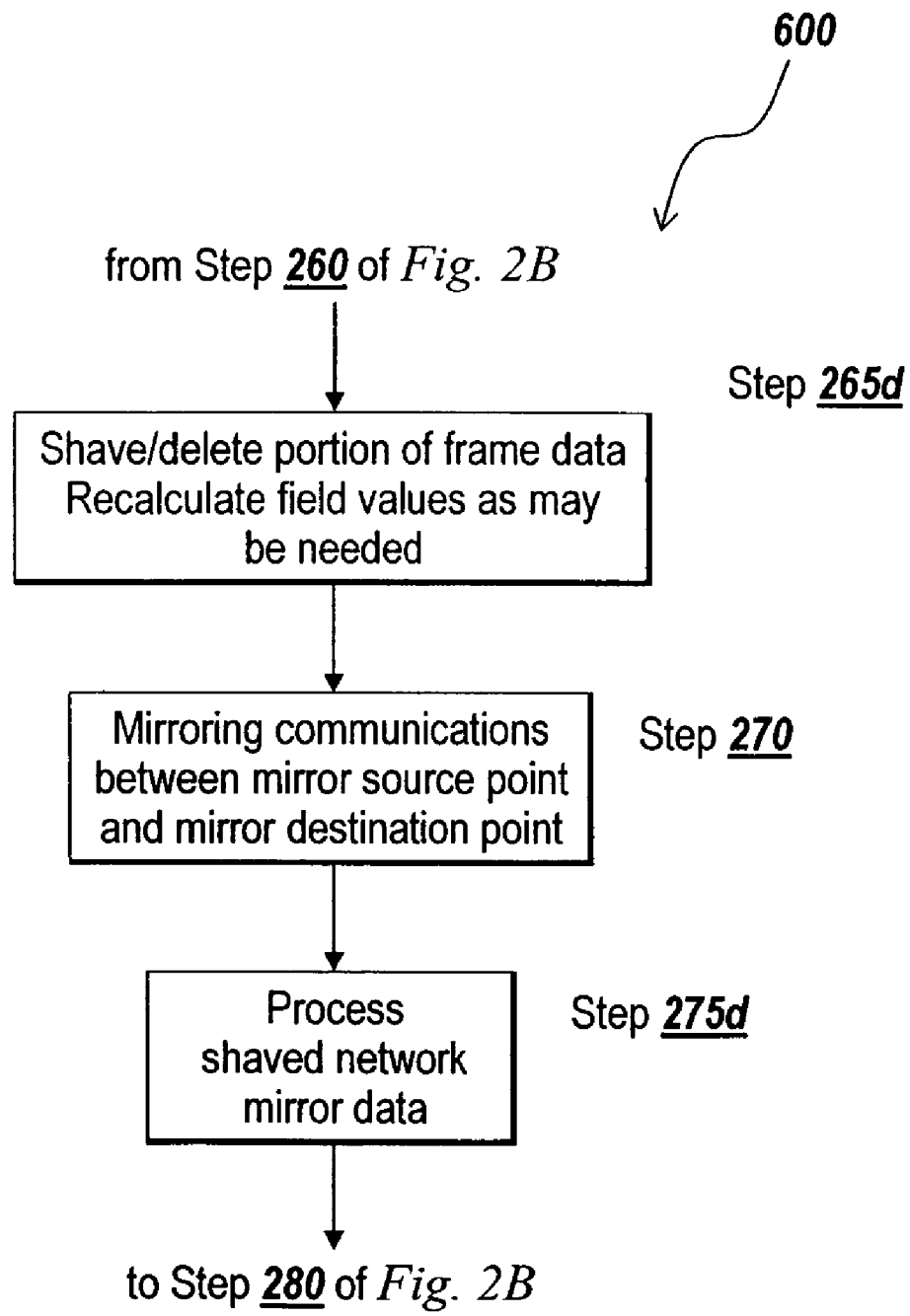
FIG. 6A is a flow diagram depicting an illustrative method for practicing an embodiment of a frame shaving data privacy technique of the present invention with the illustrative network environment of FIG. 2A and illustrative method of FIG. 2B.
Figure 6B:
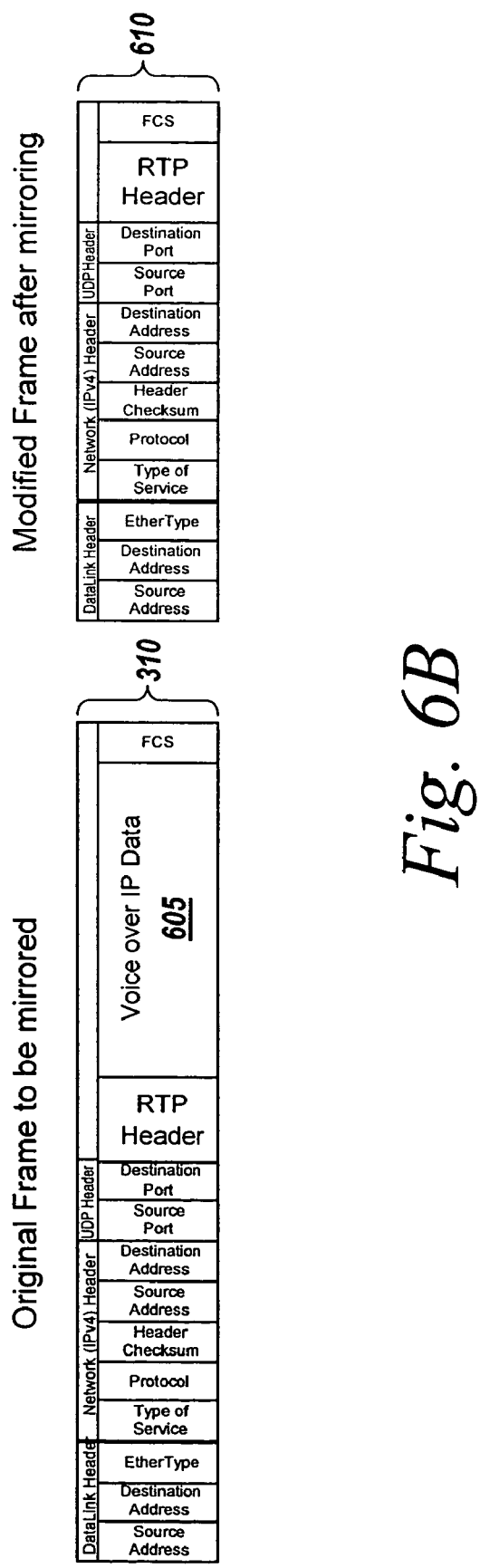
FIG. 6B depicts illustrative frames of mirrored network traffic for practicing an embodiment of the frame shaving data privacy technique of the present invention illustrated in FIG. 6A.

In another aspect, the present invention is directed towards a technique of shaving portions of frames of the mirrored network traffic 209, 209' to provide mirrored network traffic 210, 210' having data privacy. FIG. 6A depicts an illustrative method 600 of a frame shaving data privacy technique providing mirror frames with shaved data as illustrated in FIG. 6B. At step 265d of illustrative method 600, the mirrored network traffic 209, 209' provided to the mirror source point 120a-120b is processed to provide for the privacy of data of the network traffic 209, 209' to be mirrored by shaving, removing or deleting a portion of the frame. Each frame of the mirrored network traffic 209, 209' may be partially shaved for communicating to the mirror destination point 122a-122b.

The frame shaving data privacy technique is a variation of the blanking/scrambling data privacy technique discussed above. Instead of replacing the data to be kept private with a different binary pattern or mathematically scrambling the data that is to remain private, the frame shaving technique deletes the data from the mirrored frame. In some embodiments, the portion of the frame to be shaved is determined by any of the methods for determining statically and dynamically defined scrambling/blanking offsets as described above in conjunction with FIGS. 5A and 5B.

The example depicted in FIG. 6B illustrates a modified mirror frame 610 resulting from the frame shaving data privacy technique applied to mirroring a frame 310 having VoIP data 605. In one embodiment, the mirroring network device 110a-110n dynamically detects that the frame 310 is associated with a VoIP data stream utilizing UDP/IP protocols and the Real Time Protocol (RTP) to transport voice traffic. Since the VoIP data 605 is desired to be kept private and may not be needed for network trouble shooting, the VoIP data 605 is not included in the modified mirror frame 610. In some embodiments, the RTP header may not be needed and is also shaved or not included in the modified mirror frame 610. In other embodiments, any contiguous header, field, and/or data portion of the frame 310 related to an application layer protocol may be shaved.

The mirroring network device 110a-110n applying the shaving data privacy technique of illustrative method 600 may build, form or otherwise provide a modified mirror frame 610 that meets the data link, network layer, and other Open Systems Interconnection network model (OSI) layer requirements for a valid length frame 610. Value of any other fields of the modified mirror frame 610, such as the Frame Check Sequence field, may be adjusted, modified, or changed to provide a frame 610 for communicating to the mirror destination point 122a-122b.

At step 270 of the illustrative method 600, the mirror destination point 122a-122b receives the shaved frames 610 of the mirrored network traffic 210, 210' having data 605 removed, and at step 275d, the mirrored network traffic 210, 210' is processed. In some embodiments, the removal of the data 605 of frame 310 may be ignored, such as by the receiving network device 110a-110n or analyzer 105a-105n, and the available portions of the frame 310 are provided as the mirrored copy of the frame 310.

In a further aspect, any of the data privacy techniques of the present invention discussed above may be combined to provide data privacy of mirrored network traffic. For example, in one embodiment, a portion of a frame may be blanked and another portion scrambled to provide for the privacy of data of mirrored network traffic. In another embodiment, a portion of the frame may be scrambled and encrypted and encapsulated in a tunneling protocol. In a further embodiment, a frame may be partially encrypted and portions not encrypted may be blanked, scrambled, or shaved. One ordinarily skilled in the art will recognize and appreciate that one or more of the data privacy techniques may be combined and used together in practicing the operations of the present invention described herein.

Although the data privacy techniques of the present invention are discussed in conjunction with the illustrative network environment 200 of FIG. 2A having a mirror source point 120a-120n communication to a mirror destination point 122a-122b over a network, the operations and data privacy techniques of the present may be practiced in a single network device having both the mirror source point 120a-120b and the mirror destination point 122a-122b as one ordinarily skilled in the art will recognize and appreciate. For example, a network manager may desire to a configure a network device 110a-110n to maintain data privacy for local port mirrors when a device operator or technician is utilizing local port mirrors to trouble shoot a problem.

Figure 7A:
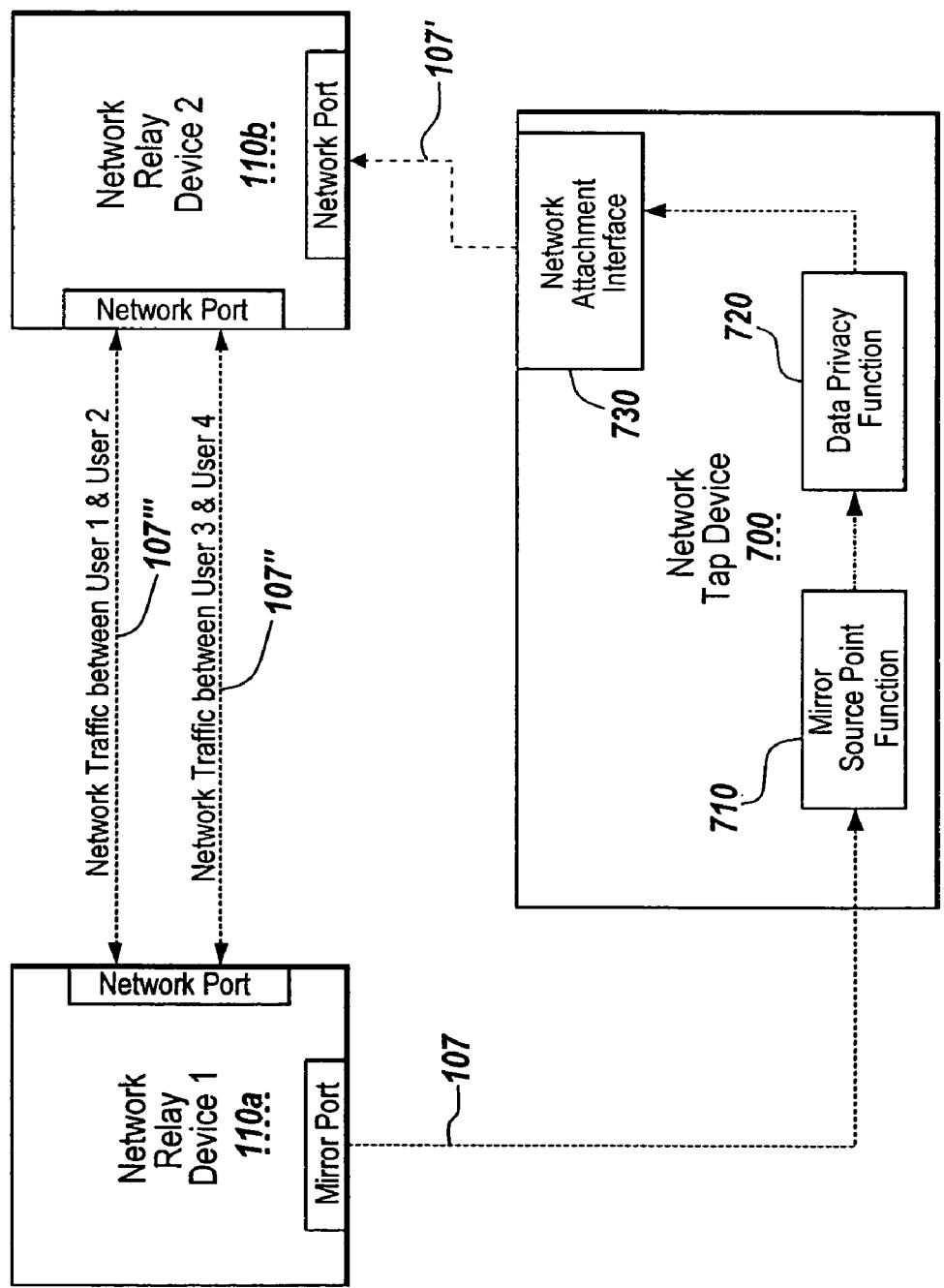
FIG. 7A is a block diagram depicting an illustrative network tap device of the present invention in an illustrative network environment.

In one aspect, the present invention is directed towards applying one of the data privacy techniques in an external device or apparatus. FIG. 7A depicts an external device, such as a network tap device 700, used for providing a data privacy technique. In brief overview, the network tap device 700 comprises a mirror source point function 710, a data privacy function 720, and a network attachment interface 730. The mirror source point function 710 may be interfaced with and in communication with the data privacy function 720 and the data privacy function 720 may be interfaced with and in communication with the network attachment interface 730 by any suitable interface and communications means and/or mechanism. In some embodiments, the data privacy function 720 may be included as part of the mirror source point function 710, or vice-versa.

The mirror source point function 710 receives and processes any mirrored network traffic that may be received via a connection to a network such as a connection to a mirror port of a network device 110a-110n or any other device, such as an analyzer 105a-105n or a tap device, such as a physical media tap device. In some embodiments, the mirror source point function 710 may include or be a part of one or more ports or port modules of the network tap device 700. In other embodiments, the mirror source point function 710 may determine whether or not data privacy is to be applied to the mirrored network traffic by the data privacy function 720.

The data privacy function 720 of the network tap device applies any of the data privacy techniques of illustrative methods 300, 400, 500 and 600, alone or in combination, to mirrored network traffic provided by the mirror source point function 710. In some embodiments, the network tap device 700 and/or the data privacy function 720 is configured to be able to operate multiple or all of the data privacy techniques of the present invention. For example, an operator of the network tap device 700 may be able to configure or specify the type of data privacy to apply to the mirrored network traffic. Additionally, the operator of the network tap device 700 may configure or specify parameters, variables, settings, options, rules, and other configurable logic for the particular data privacy technique or techniques selected for operating the network tap device 700.

Although generally referred to as a function, the mirror source point function 710 and the data privacy function 720 may comprise any means and/or mechanism for providing the mirror source point functionality and the data privacy functionality. The mirror source point function 710 and the data privacy function 720 may be implemented in software, hardware, or any combination thereof.

The network attachment interface 730 provides a point of interconnection and communication interface between the network tap device 700 and a network or another device, such as connecting to a port of a network device 110a-110n. In some embodiments, the network attachment interface 730 comprises one or more ports or ports modules as known by those ordinarily skilled in the art. Additionally, the network attachment interface 730 may be designed and configured to interface to a Local Area Network (LAN), a Metropolitan Area Network (MAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. Connections via the network attachment interface 730 can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

In operation as illustrated in FIG. 7A, the network tap device 700 may be connected to a mirror port of a network device 110a to receive frames of network traffic mirrored from the mirror port. The mirrored network traffic may comprise network traffic between one or more users, such as between a first user and a second user or between a third user and a fourth user that may be communicated between network device 110a and network device 110b. The mirror source point function 710 receives and processes frames of the mirrored network traffic and provides the frames to the data privacy function 720. The data privacy function 720 performs a data privacy technique on the frames of mirrored network traffic, such as any of the techniques of methods 300, 400, 500, and/or 600. The data privacy function 720 provides altered or modified mirror frames providing the desired data privacy to the network attachment interface 730 for communicating to a mirror destination point 122a-122b. In some embodiments, the data privacy function 720 may provide the modified mirror frames to the mirror source point 710 for communicating out to the connected mirror port of network device 110a.

Figure 7B:
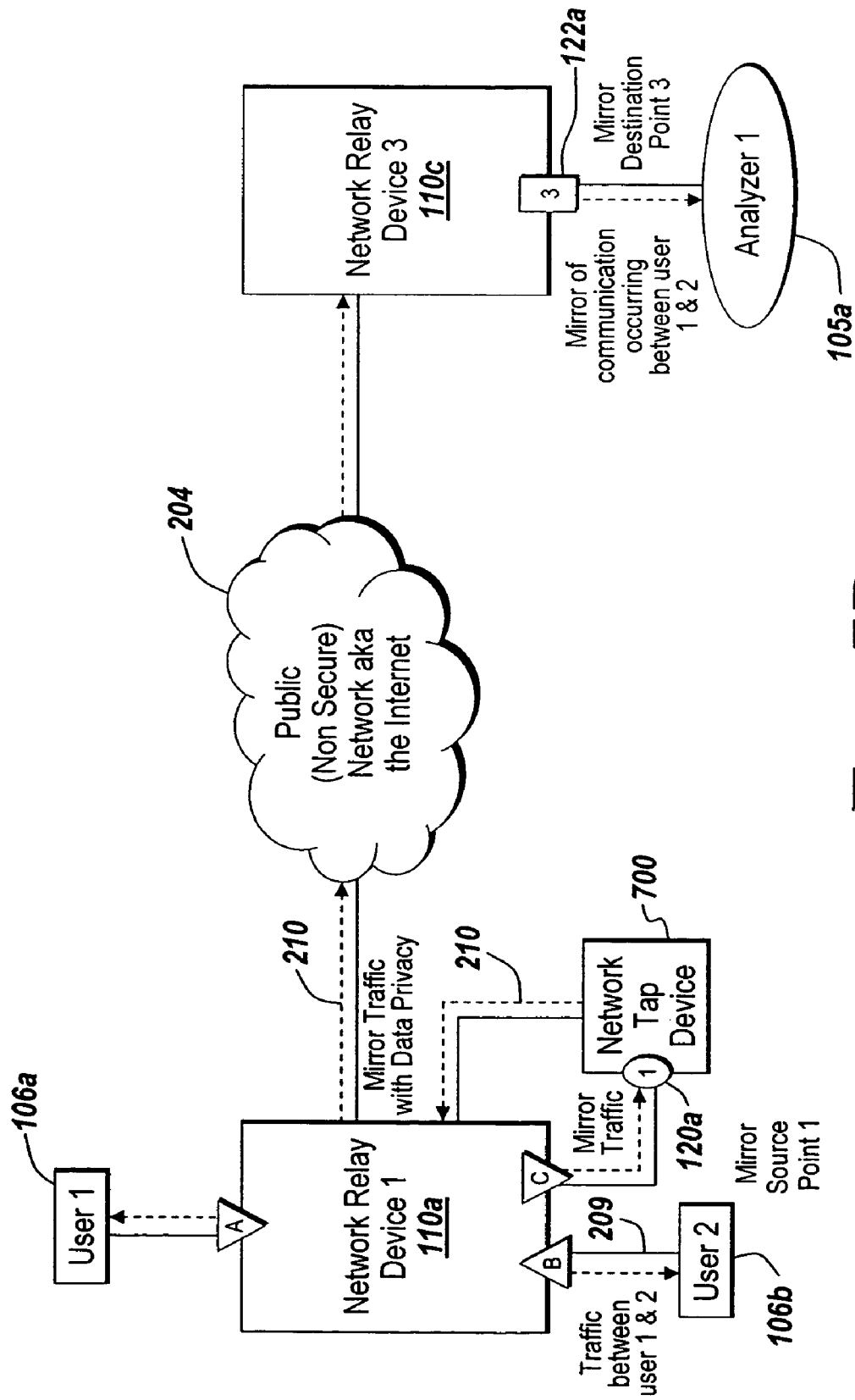
FIG. 7B is a block diagram depicting an illustrative network tap device of the present invention in another illustrative network environment.
Figure 7C:
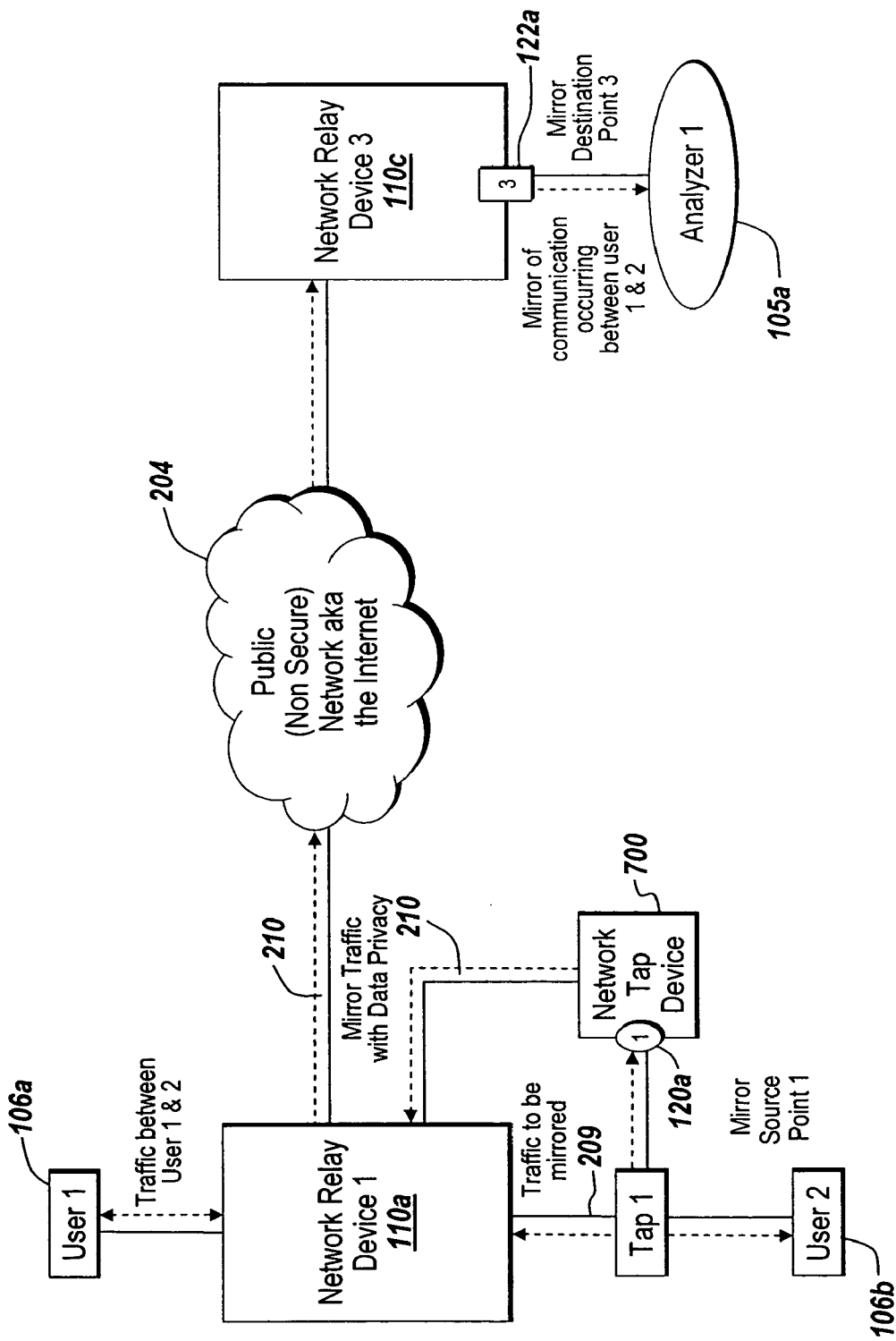
FIG. 7C is a block diagram depicting an illustrative network tap device of the present invention connected to a network tap in another illustrative network environment.

In some embodiments, the network tap device 700 may be connected to a network that may not include any network device 110a-110n designed or configured to apply any of the data privacy techniques of the present invention. As such, the network tap device 700 may be used as an external and network connectable device to provide for data privacy of mirrored network traffic where a network or a portion of a network, such as network segment, is not designed or configured to provide mirroring data privacy. FIGS. 7A and 7B depict illustrative examples of using the network tap device 700 in a network environment.

FIG. 7A depicts the use of the network tap device to provide a data privacy technique, such as providing an encrypted remote mirror tunneling function. A network conversation is occurring between User 1 and User 2 connected to network device 110*a*. Network device 110*a* is configured to replicate traffic (frames) as they ingress into the device from User 1 at port A and User 2 at port B to port C. The network tap device 700 is connected to port C. The interface of the network tap device 700 that connects to port C is the mirror source point 120*a*-120*b* for the mirrored network traffic. As network traffic is received at the mirror source point 120*a*, it is processed by the mirror source point function 710 and encrypted and encapsulated by the data privacy function 720 in a network tunnel destined to mirror destination point 122*a* of network device 110*a* connect to analyzer 105*a*. The encapsulated and encrypted mirrored network traffic leaves the network port device 700 either through the port, i.e., mirror source point 120*a*, where the mirrored network traffic was received, or on another port connected to network device 110*a*, or any other network connected device 110*a*-110*n*.

FIG. 7B depicts another illustrative example of utilizing the network tap device 700. In this example, the network tap device 700 is connected to a "tapping" device 750 instead of a port on a network device 100*a*. The tap device 750 can be either an active or passive device that is inserted between two or more network devices 110*a*-110*n* for the purpose of intercepting, copying or observing the traffic passing between two points by another device, in this case the network tap device 700. One ordinarily skilled in the art will recognize and appreciate that any type and/or form of tap device 750 may be used in practicing the operations of the present invention described herein.

As in FIG. 7A, once the network tap device 700 has received the network traffic at mirror source point 120*a* from the tap device 750, the network tap device 700 will perform a data privacy technique in accordance with the operations of the present invention and communicate the mirrored network traffic having data privacy to the mirror destination point 122*a*. For example, the network tap device 700 may encapsulate and encrypt the network traffic within a network tunnel destined for mirror destination point 122*b*.

The network tap device 700 may be used in applications where network operators, network security personnel, or law enforcement entities desire to be able to put under surveillance network traffic for trouble shooting, security auditing or evidence acquisition purposes without exposing the monitored traffic to any other entity with access to the network. In some embodiments, law enforcement entities and personnel may gain access to a corporate or enterprise network or a service provider network and insert a network tap device 700 to capture network traffic for surveillance and direct suspect traffic to another location and/or network, such as an office and network of the law enforcement entity. The network tap device 700 of the present invention may be utilized to ensure that only law enforcement personnel would have access to the mirrored traffic.

Figure 8A:
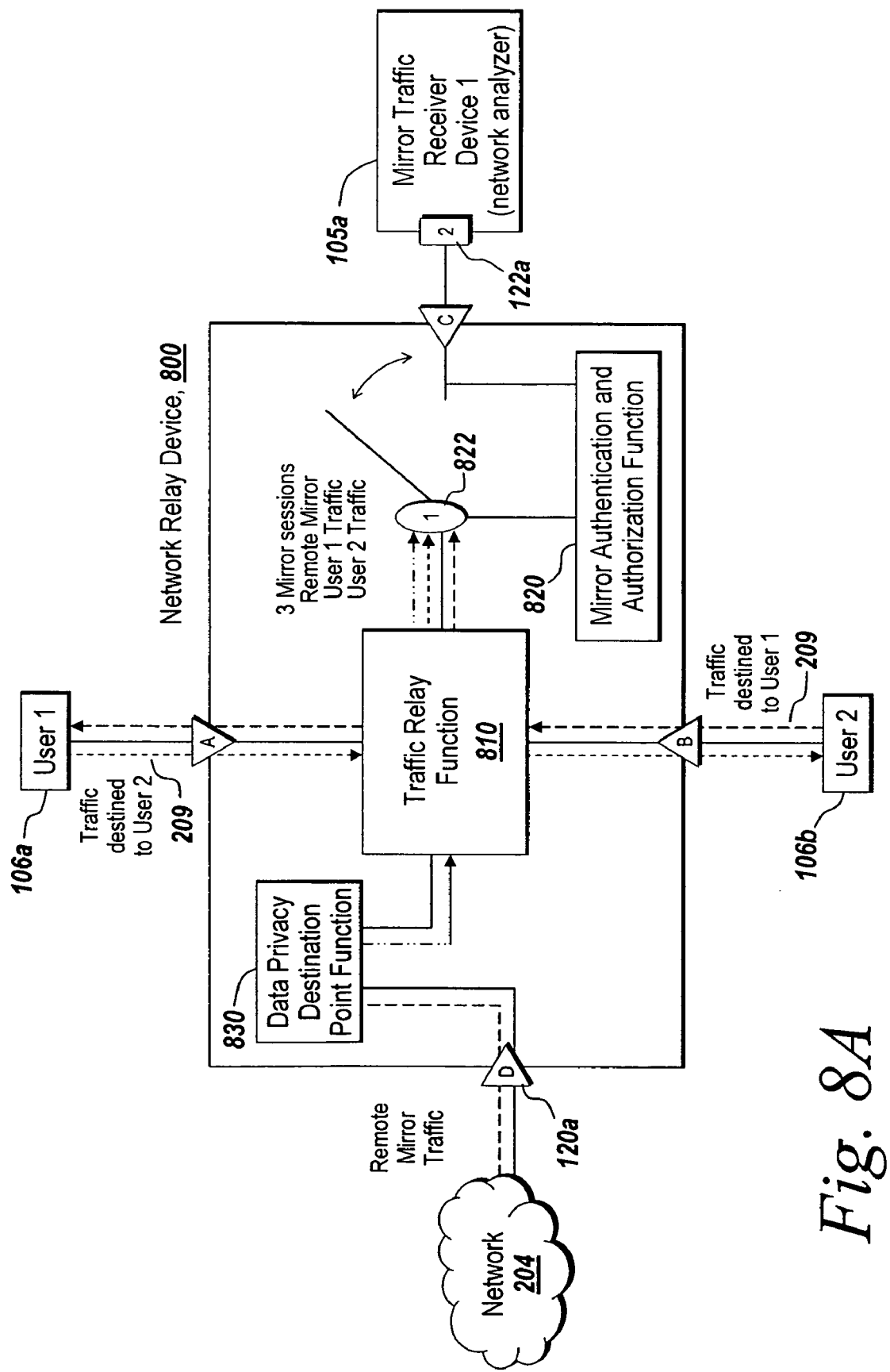
FIG. 8A is a block diagram depicting an illustrative network relay device of the present invention providing mirror authentication and authorization in an illustrative network environment.

In an additional aspect, the present invention is directed towards systems and method for the authentication, authorization, and/or validation of mirror receiving devices. FIG. 8A depicts an illustrative embodiment of a network relay device 800 that provides for the authentication and authorization of an illustrative mirror receiving device 105*a* such as an analyzer. In brief overview, the network relay device 800 includes a traffic relay function 810, a mirror authentication and authorization function 820, and a data privacy destination point function 830. The traffic relay function 810 comprises any type and/or form of a suitable means and/or mechanism for relaying any received network traffic at any ports of the network relay device 800 to the desired or intended destination via any ports of the network relay device 800. Although the traffic relay function 810 is referred to as a function, those ordinarily skilled in the art will recognize and appreciate the network traffic relaying functionality provided by a network relay device and that traffic relay function 810 may have many possible implementations in software and/or hardware.

The data privacy destination point function 830 performs any processing on received mirrored network traffic to handle any alteration to the frame of the mirrored network traffic from the application of any of the data privacy techniques of the present invention. The data privacy destination point function 830 may perform any of the mirror destination point processing steps 275*a*, 275*b*, 275*c*, and/or 275*c* of illustrative methods 300, 400, 500, and 600 respectively. In one embodiment, the data privacy destination point function 830 performs de-encapsulation and/or decryption of a frame of mirrored network traffic that may have been encapsulated and/or encrypted. In another embodiment, the data privacy destination point function 830 decrypts a portion of a frame that may have been partially encrypted. In other embodiments, the data privacy destination point function 830 may unscramble scrambled data. In further embodiments, the data privacy destination point function 830 may change or provide new values for any field of the mirrored network traffic to provide the intended or desired mirrored network traffic to the mirror receiving device 105*a*.

The mirror authentication and authorization function 820 includes any type and/or form of a means and/or mechanism for authenticating and authorizing a mirror receiving device 105*a* to receive mirrored network traffic via the network relay device 800. The mirror authentication and authorization function 820 may be implemented in software, hardware, or any combination thereof. In some embodiments, the mirror authentication and authorization function comprises a switching mechanism 822 for opening or closing a flow of mirrored network traffic to the mirror receiving device 105*a*. The switching mechanism 822 may comprise a logical and/or a physical switching mechanism for controlling the flow of mirrored network traffic to the mirror receiving device 105*a*. Although a representation of a physical switch is used to logically illustrate the switching mechanism 822 in FIG. 8A, one ordinarily skilled in the art will recognize and appreciate that the switching mechanism 822 may not be a switch. In an exemplary embodiment, the switching mechanism 822 may be a logical entity or function, such as a command or executable instruction, that forwards network traffic to a port or not. The switching mechanism 822 controls the forwarding of mirrored network traffic based on the status or state of authentication and/or authorization of the mirror receiving device 105*a* connected to or otherwise in communication with a port controlled by the switching mechanism 822 in conjunction with the mirror authentication and authorization function 820.

If the mirror authentication and authorization function 820 authenticates and/or authorizes the mirror receiving device 105*a* to receive mirroring network traffic, the mirror authentication and authorization function 820 will close or otherwise manipulate the switching mechanism 822 to allow for mirrored network traffic to be sent to the mirror receiving device 105*a*. If the mirror receiving device 105*a* fails to authenticate and/or be authorized by the mirror authentication and authorization function 820, the switching mechanism 822 will be closed or otherwise manipulated to prevent the communication of mirrored network traffic to the mirror receiving device 105a. The mirror authentication and authorization function 820 may comprise any type and/or form of logic, functionally, or business rules to perform the operations of the present invention as described herein. Additionally, the logic, functionally or business rules of the mirror authentication and authorization function 820 may be configurable by an operator of the network relay device 800.

As depicted in FIG. 8, the illustrative network relay device 800 is providing three mirror sessions directed to port C. In this example, network traffic from port A and port B are locally mirrored to port C. A remote port mirror session is being received on port D, processed by the data privacy destination point function 830, and then forwarded by the relay function to port C. The forwarding of the three mirror sessions to port C to the mirror receiving device 105a is controlled by the mirror authentication and authorization function 810.

Figure 8B:
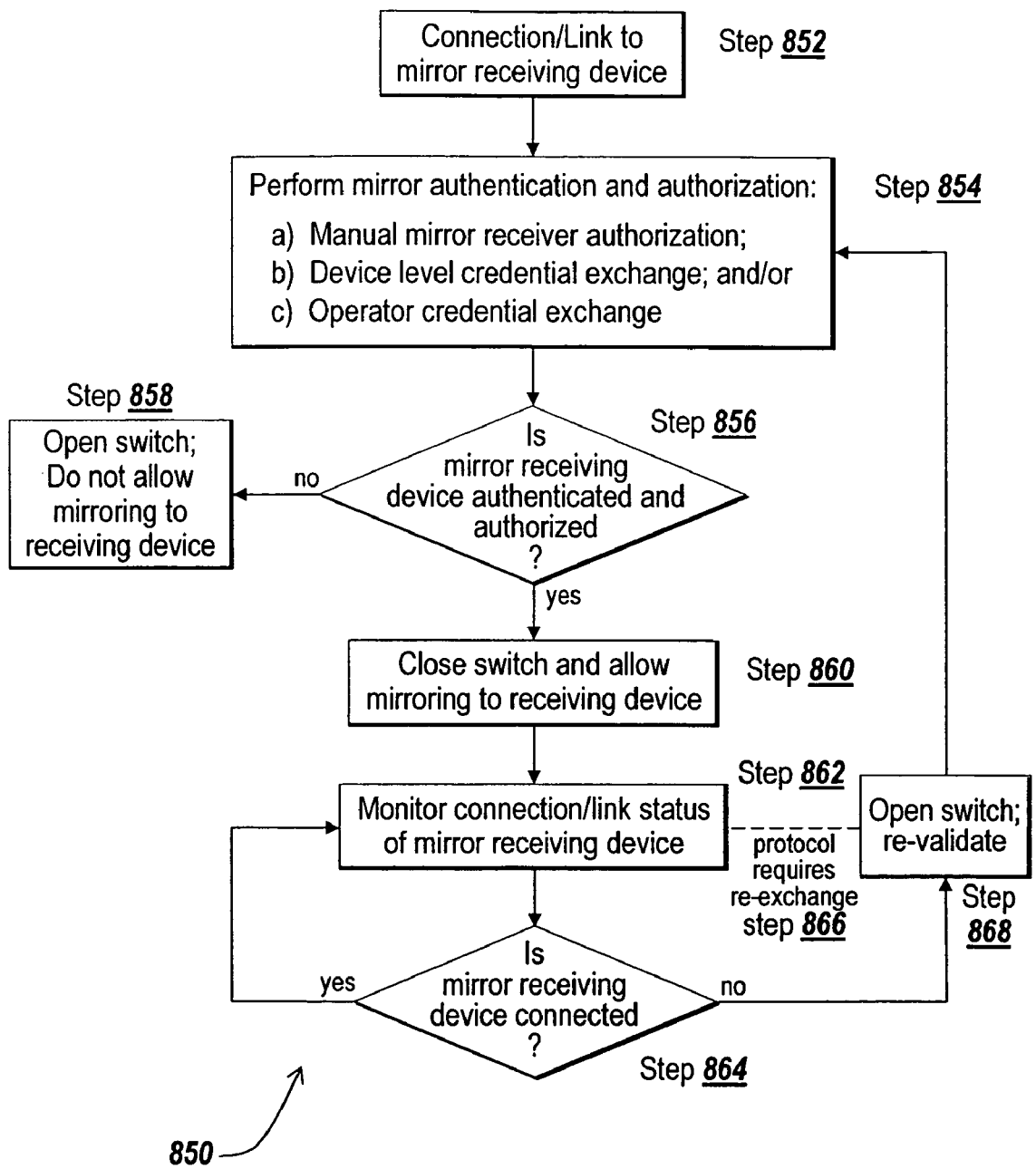
FIG. 8B is a flow diagram depicting an illustrative method for practicing an embodiment of the present invention to authenticate and authorize a mirror receiving device.

In operation and as depicted by illustrative method 850 of FIG. 8B, the network relay device 800 performs authentication and authorization of a mirror receiving device 105a and may re-validate the authentication and authorization of the mirror receiving device 105a upon a change in connection status or according to the authentication and authorization protocol. At step 852 of illustrative method 850, a mirror receiving device 105a is connected to the network relay device 800. At step 854, the network relay device 800 performs mirror authentication and/or authorization on the mirror receiving device 105a. In one embodiment, the network relay device 800 performs authentication and/or authorization upon the indication of the mirror receiving device 105a being connected to the network relay device 800. In other embodiments, the network relay device 800 performs authentication and/or authorization of the mirror receiving device 105 upon the establishment of a mirroring session, or the receipt of the first frame of mirrored network traffic by the network relay device 800. In another embodiment, the network relay device 800 performs authentication and/or authorization of the mirror receiving device 105 upon request by a mirror source point 122a-122b or by any operator of the network relay device 800.

At step 854 of the illustrative method 800, the mirror authentication and authorization function 820 may use various techniques for authentication and/or authorization of the mirror receiving device. In some embodiments, the mirror authentication and authorization function 820 uses a manual mirror receiver authorization technique. This technique requires the operator of the mirror receiving device 105a to manually enter authentication and authorization credentials at the network relay device 800 either through a direct console configuration mechanism or via a remote device configuration protocol such as Simple Network Management Protocol (SNMP). The manual mirror receiver authorization technique allows network device operators with lower levels of authority to still enable port mirroring sessions by providing credentials and passwords when network device operators do not have authorization to the highest level of relay device configuration, such any configuration of traffic relay function 810. One ordinarily skilled in the art will recognize and appreciate the various types of authentication and/or authorization credentials that may be used in practicing the present invention as described herein.

In one embodiment of step 854 of illustrative method 850, the mirror authentication and authorization function 820 may use an operator credential exchange from the mirror receiving device 105a. This method is similar to the manual mirror receiving authorization method described above, except that the authentication and/or authorization credentials are provided by the mirror receiving device 105a as entered or otherwise provided by the operator of the mirror receiving device 105a In another embodiment of step 854 of illustrative method 850, the mirror authentication and authorization function 820 may use a device level credential exchange protocol. This method would utilize a protocol to exchange device level credentials between the network relay device 800 and the mirror receiving device 105a. In one embodiment, a device level credential may comprise a predefined password string or any other type and/or form of characters for authentication purposes. In another embodiment, device level credential may include a Public Key Infrastructure (PKI) Certificate that can be validated by an external entity such as Verisign of Mountain View, Calif., or a PKI infrastructure of a company or organization. One ordinarily skilled in the art will recognize and appreciate the various types of device level credentials that be used in performing authentication and/or authorization of the mirror receiving device in practicing the present invention as described herein.

Additionally, at illustrative step 854, the network relay device 800 or the mirror authentication and authorization function 820 may log any information related to the authentication and/or authorization of the mirror receiving device 105a. For example, the network relay device 800 or the mirror authentication and authorization function 820 may log the enabling of a mirror, the credentials of the operator or device, and time stamps of the configuration. Additionally, the network relay device 800 or the mirror authentication and authorization function 820 may log and time stamp any authentication and/or authorization attempts, failures, errors, retries or re-validation.

At step 856 of illustrative method 850, if the mirror receiving device is authenticated and/or authorized as may be indicated by the mirror authentication and authorization function 820, the switching mechanism 822, at step 860, is closed to allow the flow of mirrored network traffic to the mirror receiving device. If the mirror receiving device 105a fails authentication and authorization by the mirror authentication and authorization function 820, the switching mechanism 822 is opened at step 858 to prevent the flow of mirrored network traffic to the mirror receiving device 105a. One ordinarily skilled in the art will recognize and appreciate that the switching mechanism may already be in the desired open or closed state and therefore at step 858 the switching mechanism 822 may remain open or a step 868 remain closed as the case may be.

At illustrative step 862, the network relay device 800 may monitor the connection and link status of the authenticated and authorized mirror receiving device 105a. The mirror authentication and authorization function 820 can re-validate that a mirror receiving device 105a that has been validated, e.g., authenticated/authorized, has not changed. In one embodiment, the network relay device 800 or the mirror authentication and authorization function 820 may monitor the port link status of the mirror receiving device 105a. The network relay device 800 or the mirror authentication and authorization function 820 may detect a port's link state change to indicate that the mirror receiving device 105a is unlinked. In one embodiment, a loss of link signal on a port's receiver circuit may be detected. In another embodiment, the status may be detected through a link status detection protocol. As one ordinarily skilled in the art will recognize and appreciate, a link status detection protocol can recognize if a link is partially disabled when the port's receive circuit is still receiving a signal.

If the mirror receiving device is detected or determined to be still connected and valid at step 864, the network relay device 800 or the mirror authentication and authorization function 820 may continue to monitor the connection/link status at step 862. If the mirror receiving device is detected or determined to have an unlink or invalid status at step 864, the mirror authentication and authorization function 820 at step 868 would close the switching mechanism 822 to disable or discontinue the follow of mirrored network traffic to the port and therefore, the mirror receiving device 105*a*. In some embodiments, the mirror authentication and authorization function 820 may disable the flow of mirrored network traffic to the mirror receiving device 105*a* even if the port's link state has changed back to a linked state. Additionally, at step 868, the network relay device 800 or the mirror authentication and authorization function 820 may cause the mirror receiving device 105*a* to be re-validated by re-executing the mirror authentication and authorization step 854.

In another embodiment, at step 862, a protocol may be implemented by the network relay device 800 or the mirror authentication and authorization function 820 that requires re-authentications and/or re-authorization. At step 862, while monitoring the connection status of the mirror receiving device 105*a*, the protocol may require the mirror receiving device 105*a* to be re-validated at step 868. In some embodiments, the switching mechanism 822 may be opened for re-validation and, in other embodiments, the switching mechanism 822 may remain closed. The re-validation step 868 may be performed at any specified or configured intervals or frequency. If the mirror receiving device 105*a* fails to re-authenticate and/or re-authorize at step 854 and step 856, the switching mechanism 822 is opened at step 858. Otherwise, if the mirror receiving device 105 is re-authenticated and/or re-authorized at steps 854 and 856, the switching mechanism 822 is closed to allow the continued flow of mirrored network traffic to the mirror receiving device 105*a*.

Although the illustrative method 850 is described above in conjunction with a mirror receiving device 105*a* of an analyzer connected directly to the network relay device 900 as illustrated in FIG. 8A, those ordinarily skilled in the art will recognize and appreciate that any type of mirror receiving device may be used in practicing the operations of the present invention described herein. Additionally, those ordinarily skilled in the art will recognize and appreciate that the mirror receiving device may not be directly connected to the network relay device 800 and the operations of the illustrative method 800 may be performed with a mirror receiving device connected to the network relay device 800 via one or more other network devices, network segments, transmission mediums, and networks, public or private.

In a further aspect, the present invention is directed towards the trusted mutual authentication and/or authorization of a mirror source point 122*a* and a corresponding mirror destination point 122*b*. The mirror sender or mirror source point 120*a*-120*b* and the mirror receiver or mirror destination point 122*a*-122*b* may mutually or independently verify that they are authentic entities and are authorized to send or receive the mirrored data between each other. The mirror source point 120*a*-120*b* may authenticate and authorize that the mirror destination point 122*a*-122*b* is an authentic and/or trusted entity for sending mirror network traffic to. Likewise, the mirror destination point 122*a*-122*b* may authenticate and authorize that the mirror source point 120*a*-120*b* is an authentic and/or trusted entity for receiving mirror network traffic from.

Figure 8C:
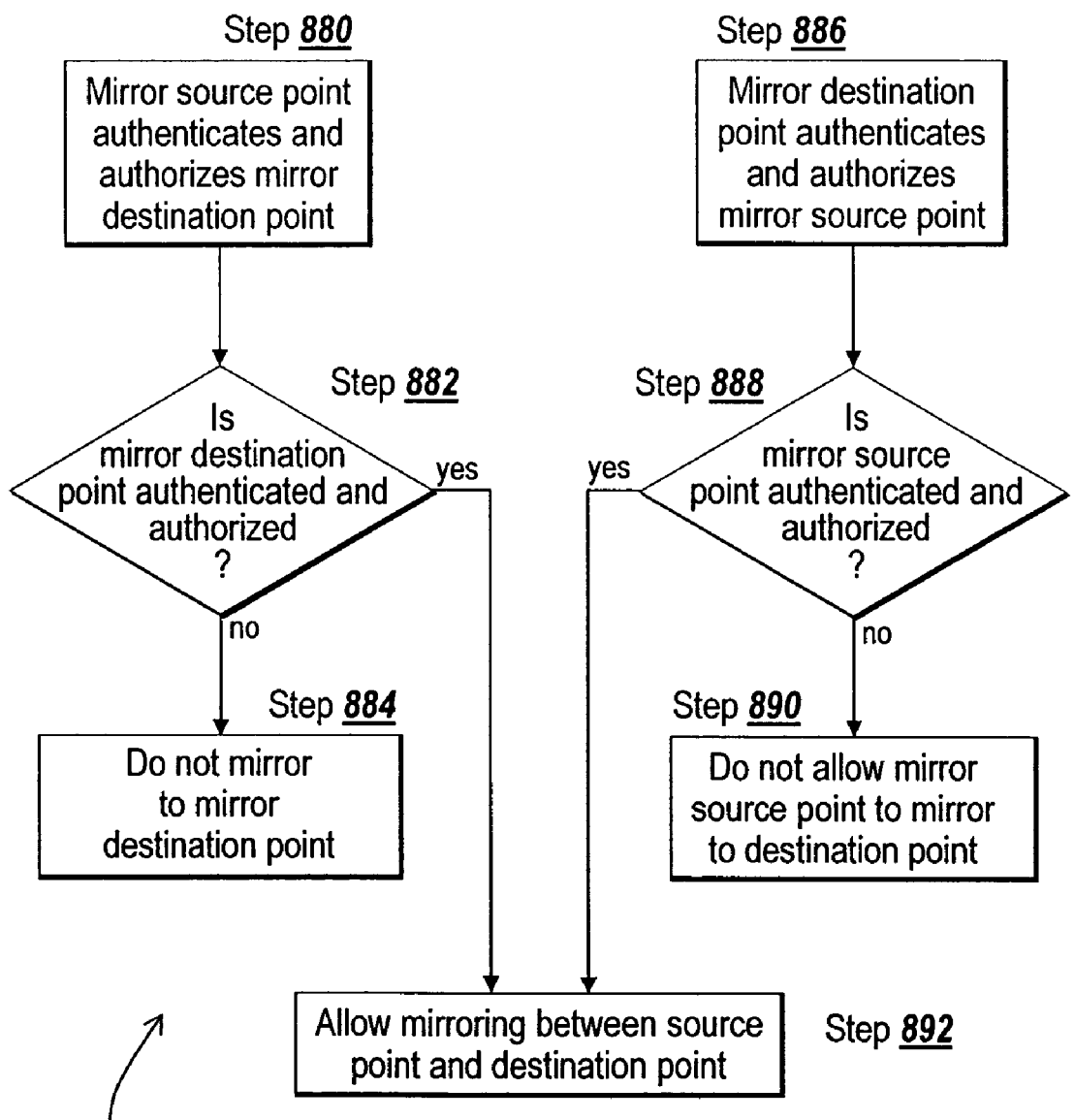
FIG. 8C is a flow diagram depicting an illustrative method for practicing an embodiment of the present invention to mutually authenticate and authorize mirror end points.

FIG. 8C depicts an illustrative method 875 for the independent and/or mutual authentications and authorization of a mirror source point and a mirror destination point. At step 880, the mirror source point 120*a*-120*b* authenticates and/or authorizes the mirror destination point. In some embodiments, the mirror source point 120*a*-120*b* may use the same authentication and authorization techniques as the mirror authentication and authorization function 820 of the network relay device 800 described above. If the mirror destination point 122*a*-122*b* is authenticated and/or authorized, or otherwise determined to be a trusted entity at step 882, the mirror source point 120*a*-120*b* will allow the sending of mirrored network traffic from the mirror source point 120*a*-120*b* to the trusted mirror destination point 122*a*-122*b*. Otherwise, if the mirror destination point 122*a*-122*a* is determined not to be an authenticated, authorized, or trusted entity, the mirror source point 120*a*-120*b* will not send mirrored network traffic to the mirror destination point 122*a*-122*b*.

At step 886, the mirror destination point 122*a*-122*b* authenticates and/or authorizes the mirror destination point. In some embodiments, the mirror destination point 122*a*-122*b* may use the same techniques as the mirror authentication and authorization function 820 described above. If the mirror source point 120*a*-120*b* is authenticated and/or authorized, or otherwise determined to be a trusted entity at step 888, the mirror destination point 122*a*-122*b* will allow the receiving of mirrored network traffic at step 892 from the trusted mirror source point 120*a*-120*b*. Otherwise, if the mirror source point 120*a*-120*a* is determined not to be an authenticated, authorized, or trusted entity, the mirror destination point 122*a*-122*b* will not mirrored network traffic to be received by the mirror destination point 122*a*-122*b*.

In some embodiments, the mirror destination point 122*a*-122*b* may fail authentication and/or authorization of the mirror source point 120*a*-120*b*, and vice-versa. As such, only one end of the mirroring session, either the mirror source point 120*a*-120*b* or the mirror destination point 122*a*-122*b* may be authenticated and authorized or otherwise a trusted entity. In some embodiments, in order to establish a mirroring session between a mirror source point 120*a*-120*b* and a mirror destination point 122*a*-122*b* at step 892 of illustrative method 875 the mirror source point 120*a*-120*b* and a mirror destination point 122*a*-122*b* must be mutually authenticated and/or authorized.

In some embodiments, steps 880 and 886 may utilize functions that are available within the tunneling protocol that is utilized for the transport of the mirroring session. For example, the IPSec, L2TP and PPTP tunneling protocol provide functions to validate end points, such as mirror source and destination points, that are taking part in the remote mirror session. In another embodiment, steps 880 and 886 may use a protocol utilizing any standards based protocols such as IPv4, IPv6 or any other type of protocol that allows for bi-directional conversations between the devices or mirror source and destination points participating in the mirroring session. The protocol may operate over a communication network and provide for the establishment of trusted tunnels between the end points in a remote mirror session. This protocol can be used to exchange credentials, passwords or even manually entered credentials between the end points. The protocol also supports the ability to re-validate the provided identity and credentials periodically to ensure that the end points are still authorized to participate within the remote mirror session.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for providing data privacy of mirrored network traffic during mirroring between a mirror source point and a mirror destination point, the method comprising the steps of:
   receiving a unit of network traffic from a data source point at a mirror source point of a packet forwarding device on a network for mirroring to a mirror destination point, the data source point and the mirror source point being remotely located from each other;
   altering, by the mirror source point of the packet forwarding device, the unit to provide privacy for at least a portion of selected data of the unit during at least a portion of mirroring communications to the mirror destination point; and
   communicating, by the mirror source point of the packet forwarding device, the altered unit toward the mirror destination point unbeknownst to the data source point and a data destination point.

2. The method of claim 1, wherein the altering step comprises encrypting the unit and encapsulating the encrypted unit in a tunneling protocol communicated from the mirror source point.

3. The method of claim 2, wherein the tunneling protocol comprises one of the following: Point-To-Point Tunneling protocol, Layer 2 Tunneling Protocol, Generic Routing Encapsulation, Internet Protocol Security, MAC-in-MAC tunneling, and Multi-Protocol Label Switching.

4. The method of claim 1, wherein the altering step comprises encrypting at least a portion of the selected data of the unit and encapsulating the partially encrypted unit in a non-tunneling protocol communicated from the mirror source point.

5. The method of claim 4, wherein the non-tunneling protocol comprises one of the following protocols: Secure Sockets Layer, and HyperText Transfer Protocol Secured.

6. The method of claim 4, wherein the step of encrypting comprises encrypting at least a value of one of the following: a field of the unit associated with a network protocol layer of the unit, a field of the unit associated with an application protocol layer of the unit, and a field of a protocol layer of the unit above the transport protocol layer.

7. The method of claim 1, wherein the altering step comprises replacing at least a portion of the selected data of the unit with at least one of a random binary pattern or a predefined binary pattern.

8. The method of claim 1, wherein the altering step comprises replacing at least a portion of the selected data of the unit with the portion of the selected data scrambled via a mathematical operation.

9. The method of claim 1, wherein the altering step comprises at least one of blanking or scrambling the portion of selected data of the unit located beyond an offset determined by the mirror source point from a protocol type identified by the unit.

10. The method of claim 1, wherein the altering step comprises deleting the portion of selected data from the unit and modifying the unit to comprise a valid length unit for communications from the mirror source point.

11. The method of claim 1, wherein the portion of selected data of the unit comprises at least one of secret, classified, confidential, private, or privileged data.

12. The method of claim 1, wherein the mirror destination point is associated with a network device accessible over the network via one or more of the following: a network relay device, a network entry device, a network segment, a transmission medium, and a public network.

13. The method of claim 1, wherein the packet forwarding device comprises the mirror destination point.

14. The method of claim 1, wherein the portion of selected data of the unit comprises a communication of one or more users of the network.

15. A packet forwarding device for providing data privacy of mirrored network traffic during mirroring between a mirror source point and a mirror destination point, the packet forwarding device comprising:
   a mirror source point associated with a port on a network for receiving a unit of network traffic from a data source point for mirroring toward a mirror destination point, the data source point and the mirror source point being remotely located from each other;
   a privacy mechanism for altering the unit to provide privacy for at least a portion of selected data of the unit during at least a portion of mirroring communications to the mirror destination point; and
   a network interface for communicating the altered unit to at least one of the mirror destination point or a mirror receiving device unbeknownst to the data source point and a data destination point.

16. The packet forwarding device of claim 15, wherein the mirror source point is connected to at least one of a port of a second packet forwarding device configured to mirror network traffic or a network tapping device.

17. The packet forwarding device of claim 15, wherein the network interface communicates the altered unit via at least one of a second port of the packet forwarding device or the port of the mirror source point.

18. The packet forwarding device of claim 15, wherein the privacy mechanism encrypts the unit and encapsulates the encrypted unit in a tunneling protocol communicated via the network interface.

19. The packet forwarding device of claim 18, wherein the tunneling protocol comprises one of the following: Point-To-Point Tunneling protocol, Layer 2 Tunneling Protocol, Generic Routing Encapsulation, Internet Protocol Security, MAC-in-MAC tunneling, and Multi-Protocol Label Switching.

20. The packet forwarding device of claim 15, wherein the privacy mechanism encrypts at least a portion of the selected data of the unit and encapsulates the partially encrypted unit in a non-tunneling protocol communicated via the network interface.

21. The packet forwarding device of claim 20, wherein the non-tunneling protocol comprises one of the following protocols: Secure Sockets Layer, and HyperText Transfer Protocol Secured.

22. The packet forwarding device of claim 20, wherein the privacy mechanism encrypts a value of a field of the unit associated with at least one of a network protocol layer of the unit, application protocol layer of the unit or a protocol layer of the unit above the transport protocol layer.

23. The packet forwarding device of claim 15, wherein the privacy mechanism replaces at least a portion of the selected data of the unit with at least one of a random binary pattern or a predefined binary pattern.

24. The packet forwarding device of claim 15, wherein the privacy mechanism replaces at least a portion of the selected data of the unit with the portion of the selected data scrambled via a mathematical operation.

25. The packet forwarding device of claim 15, wherein the privacy mechanism provides for at least one of blanking or scrambling the portion of selected data of the unit located beyond an offset determined by the mirror source point from a protocol type identified by the unit.

26. The packet forwarding device of claim 15, wherein the privacy mechanism deletes the portion of selected data from the unit and modifies the unit to comprise a valid length unit for communications via the network interface.

27. The packet forwarding device of claim 15, wherein the portion of selected data of the unit comprises at least one of secret, classified, confidential, private, or privileged data.

28. The packet forwarding device of claim 15, wherein the mirror destination point is associated with a network device accessible over the network via one or more of the following: a network relay device, a network entry device, a network segment, a transmission medium, and a public network.

29. The packet forwarding device of claim 15, wherein the packet forwarding device comprises the mirror destination point.

30. The packet forwarding device of claim 15, wherein the portion of selected data of the unit comprises a communication of one or more users of the network.

* * * * *